(12) United States Patent
Takaku et al.

(10) Patent No.: US 6,295,267 B1
(45) Date of Patent: Sep. 25, 2001

(54) DIGITAL SIGNAL RECORDING APPARATUS, RECORDING METHOD THEREOF, REMOTE CONTROLLING APPARATUS FOR USE THEREWITH, REMOTE CONTROLLING METHOD THEREOF, AND DUBBING SYSTEM FOR USE THEREWITH

(75) Inventors: Yoshiyuki Takaku; Motohiko Akiyama, both of Tokyo; Hiroshi Yamaguchi, Nagano, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/152,040

(22) Filed: Sep. 11, 1998

(30) Foreign Application Priority Data

Sep. 30, 1997 (JP) .................................................. 9-266396

(51) Int. Cl.[7] ...................................................... G11B 7/00
(52) U.S. Cl. .......................................... 369/83; 369/47.13
(58) Field of Search .................................. 369/83, 84, 47, 369/48, 49, 50, 54, 58, 59, 47.1, 47.11, 47.12, 47.13, 53.1, 53.41, 59.1; 360/13, 15

(56) References Cited

U.S. PATENT DOCUMENTS 5,751,678 * 5/1998 Tanaka .................................... 369/84

* cited by examiner

*Primary Examiner*—Muhammad Edun
(74) *Attorney, Agent, or Firm*—Oblon, Spivak, McClelland, Maier & Neustadt, P.C.

(57) ABSTRACT

When a program reproduced from a reproducing apparatus such as a CD player is recorded to a recording apparatus such as an MD recorder/player, a character string that is received from the reproducing apparatus and that corresponds to a program is edited. The edited character program is recorded to the recording apparatus in such a manner that the edited character string corresponds to the program.

23 Claims, 24 Drawing Sheets

Fig. 5

| | 16 bits | | 16 bits | |
|---|---|---|---|---|
| | MSB    LSB | MSB    LSB | MSB    LSB | MSB    LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | cluster H | cluster L | 00000000 | 00000010 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | Maker code | Model code | First TNO | Last TNO |
| 8 | 00000000 | 00000000 | 00000000 | Used Sectors |
| 9 | 00000000 | 00000000 | 00000000 | 00000000 |
| 10 | 00000000 | 00000000 | 00000000 | Disc Serial No. |
| 11 | Disc | ID | P-DFA | P-EMPTY |
| 12 | P-FRA | P-TNO1 | P-TNO2 | P-TNO3 |
| 13 | P-TNO4 | P-TNO5 | P-TNO6 | P-TNO7 |
| 74 | P-TNO248 | P-TNO249 | P-TNO250 | P-TNO251 |
| 75 | P-TNO252 | P-TNO253 | P-TNO254 | P-TNO255 |
| 76 | 00000000 | 00000000 | 00000000 | 00000000 |
| 77 | 00000000 | 00000000 | 00000000 | 00000000 |
| 78 | START ADDRESS | | | TRACK MODE |
| 79 | END ADDRESS | | | LINK INFO |
| 80 | START ADDRESS | | | TRACK MODE |
| 81 | END ADDRESS | | | LINK INFO |
| 82 | START ADDRESS | | | TRACK MODE |
| 83 | END ADDRESS | | | LINK INFO |
| 580 | START ADDRESS | | | TRACK MODE |
| 581 | END ADDRESS | | | LINK INFO |
| 582 | START ADDRESS | | | TRACK MODE |
| 583 | END ADDRESS | | | LINK INFO |
| 584 | START ADDRESS | | | TRACK MODE |
| 585 | END ADDRESS | | | LINK INFO |
| 586 | START ADDRESS | | | TRACK MODE |
| 587 | END ADDRESS | | | LINK INFO |

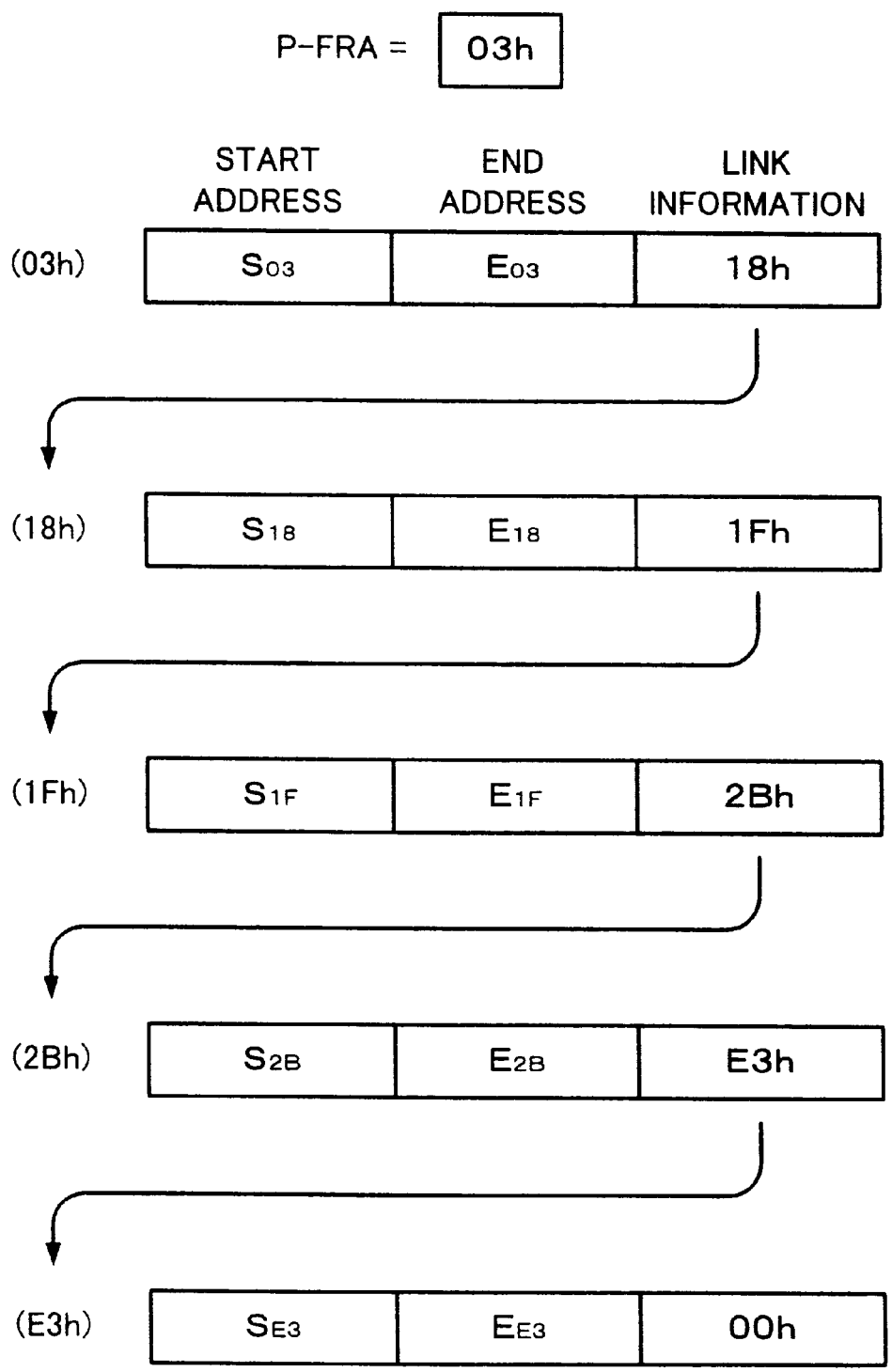

Fig. 7

| | 16 bits | | 16 bits | |
|---|---|---|---|---|
| | MSB      LSB | MSB      LSB | MSB      LSB | MSB      LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | cluster H | cluster L | 00000001 | 00000010 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | 00000000 | 00000000 |
| 8 | 00000000 | 00000000 | 00000000 | 00000000 |
| 9 | 00000000 | 00000000 | 00000000 | 00000000 |
| 10 | 00000000 | 00000000 | 00000000 | 00000000 |
| 11 | 00000000 | 00000000 | 00000000 | P-EMPTY |
| 12 | 00000000 | P-TNA1 | P-TNA2 | P-TNA3 |
| 13 | P-TNA4 | P-TNA5 | P-TNA6 | P-TNA7 |
| 74 | P-TNA248 | P-TNA249 | P-TNA250 | P-TNA251 |
| 75 | P-TNA252 | P-TNA253 | P-TNA254 | P-TNA255 |
| 76 | DISC NAME | | | |
| 77 | DISC NAME | | | LINK INFO |
| 78 | DISC NAME/TRACK NAME | | | |
| 79 | DISC NAME/TRACK NAME | | | LINK INFO |
| 80 | DISC NAME/TRACK NAME | | | |
| 81 | DISC NAME/TRACK NAME | | | LINK INFO |
| 82 | DISC NAME/TRACK NAME | | | |
| 83 | DISC NAME/TRACK NAME | | | LINK INFO |
| 584 | DISC NAME/TRACK NAME | | | |
| 585 | DISC NAME/TRACK NAME | | | LINK INFO |
| 586 | DISC NAME/TRACK NAME | | | |
| 587 | DISC NAME/TRACK NAME | | | LINK INFO |

Fig. 8

| | 16 bits | | 16 bits | |
|---|---|---|---|---|
| | MSB    LSB | MSB    LSB | MSB    LSB | MSB    LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | cluster H | cluster L | 00000000 | 00000000 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | 00000000 | 00000000 |
| 8 | 00000000 | 00000000 | 00000000 | 00000000 |
| 9 | 00000000 | 00000000 | 00000000 | 00000000 |
| 10 | 00000000 | 00000000 | 00000000 | 00000000 |
| 11 | 00000000 | 00000000 | 00000000 | P-EMPTY |
| 12 | 00000000 | P-TRD1 | P-TRD2 | P-TRD3 |
| 13 | P-TRD4 | P-TRD5 | P-TRD6 | P-TRD7 |
| 14 | P-TRD8 | P-TRD9 | P-TRD10 | P-TRD11 |
| 15 | P-TRD12 | P-TRD13 | P-TRD14 | P-TRD15 |
| 16 | P-TRD16 | | | |
| 17 | | | | |
| 73 | | | | |
| 74 | P-TRD248 | P-TRD249 | P-TRD250 | P-TRD251 |
| 75 | P-TRD252 | P-TRD253 | P-TRD254 | P-TRD255 |
| 76 | RECORD DATE/TIME | | | |
| 77 | | | MAKER CODE | MODEL CODE |
| 78 | RECORD DATE/TIME | | | |
| 79 | | | MAKER CODE | MODEL CODE |
| 80 | RECORD DATE/TIME | | | |
| 81 | | | MAKER CODE | MODEL CODE |
| 82 | RECORD DATE/TIME | | | |
| 83 | | | MAKER CODE | MODEL CODE |
| 84 | RECORD DATE/TIME | | | |
| 85 | | | | LINK INFO |
| 86 | | | | |
| 586 | RECORD DATE/TIME | | | |
| 587 | | | | LINK INFO |

Fig. 9

| | 16 bits | | 16 bits | |
|---|---|---|---|---|
| | MSB　　LSB | MSB　　LSB | MSB　　LSB | MSB　　LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | cluster H | cluster L | 00000000 | 00000000 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | 00000000 | 00000000 |
| 8 | 00000000 | 00000000 | 00000000 | 00000000 |
| 9 | 00000000 | 00000000 | 00000000 | 00000000 |
| 10 | 00000000 | 00000000 | 00000000 | 00000000 |
| 11 | 00000000 | 00000000 | 00000000 | P-EMPTY |
| 12 | 00000000 | P-TNA1 | P-TNA2 | P-TNA3 |
| 13 | P-TNA4 | P-TNA5 | P-TNA6 | P-TNA7 |
| 14 | P-TNA8 | P-TNA9 | P-TNA10 | P-TNA11 |
| 15 | P-TNA12 | P-TNA13 | P-TNA14 | P-TNA15 |
| 16 | P-TNA16 | | | |
| 17 | | | | |
| 74 | P-TNA248 | P-TNA249 | P-TNA250 | P-TNA251 |
| 75 | P-TNA252 | P-TNA253 | P-TNA254 | P-TNA255 |
| 76 | DISC NAME | | | |
| 77 | DISC NAME | | | LINK INFO |
| 78 | DISC NAME OR TRACK NAME | | | |
| 79 | DISC NAME OR TRACK NAME | | | LINK INFO |
| 80 | DISC NAME OR TRACK NAME | | | |
| 81 | DISC NAME OR TRACK NAME | | | LINK INFO |
| 82 | DISC NAME OR TRACK NAME | | | |
| 83 | DISC NAME OR TRACK NAME | | | LINK INFO |
| 84 | DISC NAME OR TRACK NAME | | | |
| 85 | DISC NAME OR TRACK NAME | | | LINK INFO |
| 86 | | | | |
| 586 | DISC NAME OR TRACK NAME | | | |
| 587 | DISC NAME OR TRACK NAME | | | LINK INFO |

Fig. 19

| FRAME | P | Q | R | S | T | U | V | W |
|---|---|---|---|---|---|---|---|---|
| F01 | S0 | | | | | | | |
| F02 | S1 | | | | | | | |
| F03 | P01 | Q01 | R01 | S01 | T01 | U01 | V01 | W01 |
| F04 | P02 | Q02 | R02 | S02 | T02 | U02 | V02 | W02 |
| ... | ... | ... | ... | ... | ... | ... | ... | ... |
| F95 | P93 | Q93 | R93 | S93 | T93 | U93 | V93 | W93 |
| F96 | P94 | Q94 | R94 | S94 | T94 | U94 | V94 | W94 |
| F97 | P95 | Q95 | R95 | S95 | T95 | U95 | V95 | W95 |
| F98 | P96 | Q96 | R96 | S96 | T96 | U96 | V96 | W96 |

SELECTING AND EDITING CD TEXT

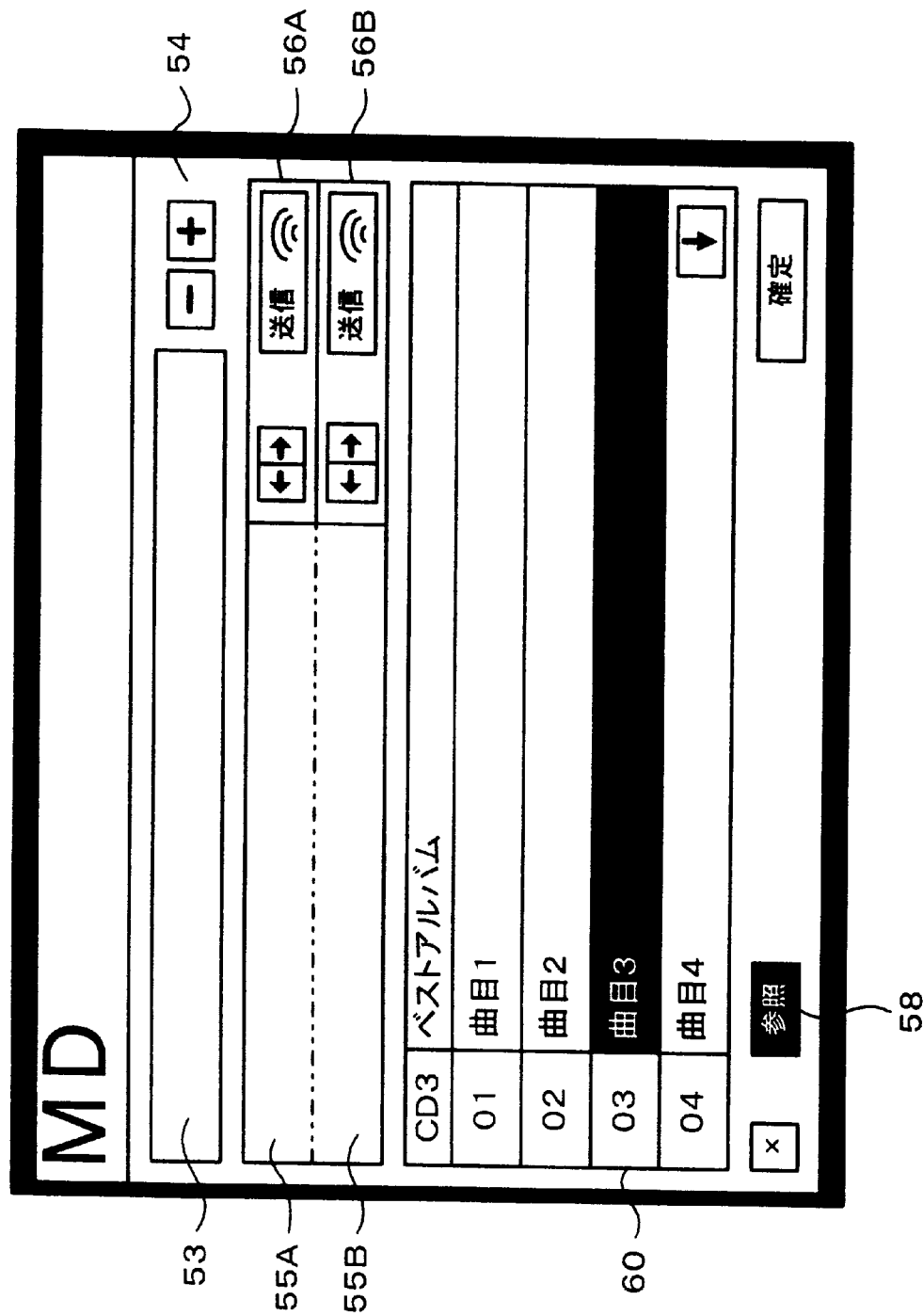

DIGITAL SIGNAL RECORDING APPARATUS, RECORDING METHOD THEREOF, REMOTE CONTROLLING APPARATUS FOR USE THEREWITH, REMOTE CONTROLLING METHOD THEREOF, AND DUBBING SYSTEM FOR USE THEREWITH

BACKGROUND OF THE INVENTION

1. Field of the Invention

The present invention relates to a digital signal recording apparatus that allows a program reproduced from a Compact Disc (hereinafter referred to as CD) to be recorded to a Mini Disc (trademark, hereinafter referred to as MD), a recording method thereof, a remote controlling apparatus for use therewith, a remote controlling method thereof, and a dubbing system for use therewith, in particular, to a recording operation of character information corresponding to a program.

2. Description of the Related Art

A magnetic optical disc apparatus that records a music program and so forth on a magnetic optical disc such as an MD is known. A U-TOC (User Table Of Content) area for managing information such as record position, record date/time, and title name concerned with a recorded program is formed in the inner periphery of such a magnetic optical disc. The U-TOC area is structured as pages. In other words, the U-TOC area has a plurality of sectors. Next, an example of the structure of the U-TOC area will be described.

The U-TOC area is composed of for example 36 sectors. Sector 0 is used to manage start/end addresses of a main program recorded on the magnetic optical disc and start/end addresses of a recordable area thereof. Sector 1 is used to manage a title name of a main program recorded on the magnetic optical disc and a title name of the magnetic optical disc. When audio data is recorded on the magnetic optical disc, a title name is a program name. In addition, a title name of the magnetic optical disc is an album name or a performer's name.

Sector 2 is used to manage record date/time of a program. Sector 4 is used to manage Kanji characters, Hiragana characters, and Katakana characters (these are all Japanese character formats) corresponding to the title name (English characters) of Sector 1. Sectors 3 and 5 to 36 are reserved for future expansions.

Before a program recorded on the magnetic optical disc is reproduced, information is reproduced from the U-TOC area. The reproduced information is stored in a predetermined storing means such as a DRAM of the apparatus in such a manner that the reproduced information correlates with each program recorded on the magnetic optical disc. When a desired program is reproduced, a title corresponding thereto is read from the memory and displayed on a displaying portion.

In the above-described conventional magnetic optical disc apparatus, to designate character information such as a title name and an artist name corresponding to a program as U-TOC information, the user should input such character information. For example, the user should operate the jog dial knob so as to vary for example alphabetic characters and input desired characters one by one. After having completed the input operation for one program, the user should perform the similar operation for another program. Thus, such a character input operation is troublesome for the user.

Since the character information recorded in sector 1 of the U-TOC area correlates with the character information recorded in sector 4 (in other words, the relation of original information and translated information such as English (alphabetic characters) and Japanese (Katakana characters), even if character information that is recorded in one sector is similar to character information that is input to another sector, similar information should be redundantly input. Thus, such an apparatus is inconvenient for the user.

OBJECTS AND SUMMARY OF THE INVENTION

Therefore, an object of the present invention is to provide a digital signal recording apparatus that receives character information from another apparatus and records the received character information to a management area of a record medium so as to allow the character input operation to be simplified and the user to edit character information received from the other apparatus, a method thereof, a remote controlling apparatus for use therewith, a method thereof, and a dubbing system for use therewith.

Another object of the present invention is to provide a digital signal recording apparatus that records character information received from another apparatus to a plurality of management areas of a record medium in a plurality of formats at a time, a method thereof, a remote controlling apparatus for use therewith, a method thereof, a dubbing system for use therewith.

A first aspect of the present invention is a digital signal recording apparatus, comprising a receiving means for receiving a character string corresponding to a program to be transmitted, an editing means for editing the character string received by the receiving means, and a recording means for recording the character string edited by the editing means to a record medium in such a manner that the character string corresponds to the program.

A second aspect of the present invention is a digital signal recording method, comprising the steps of (a) receiving a character string corresponding to a program being transmitted, (b) displaying the character string received at step (a), (c) editing the character string displayed at step (b), (d) recording the character string edited at step (c) in such a manner that the character string corresponds to the program.

A third aspect of the present invention is a remote controlling apparatus, comprising a receiving means for receiving a character string corresponding to a program received from a reproducing apparatus, a storing means for storing the character string received by the receiving means, a displaying means for displaying the character string stored by the storing means, an editing means for editing the character string displayed by the displaying means, a transmitting means for transmitting the character string edited by the editing means to a recording apparatus.

A fourth aspect of the present invention is a remote controlling method, comprising the steps of (a) receiving a character string corresponding to a program transmitted from a reproducing apparatus, (b) storing the character string received at step (a), (c) displaying the character string stored at step (b), (d) editing the character string displayed at step (c), and (e) transmitting the character string edited at step (d) to a recording apparatus.

A fifth aspect of the present invention is a dubbing system, comprising a reproducing apparatus having a reproducing means for reproducing a program and a character string corresponding thereto, and a transmitting means for transmitting the program and the character string reproduced by the reproducing means, an operating apparatus having a receiving means for receiving the character string transmitted from the transmitting means of the reproducing apparatus, a storing means for storing the character string received by the receiving means, a displaying means for displaying the character string storing by the storing means, an editing means for editing the character string displayed by the displaying means, and a transmitting means for transmitting the character string edited by the editing means, and a recording apparatus having a receiving means for receiving the program transmitted from the transmitting means of the reproducing apparatus and the character string transmitted from the transmitting means of the operating apparatus, and a recording means for recording the program and the character string received by the receiving means.

According to the present invention, when a program reproduced by a reproducing apparatus such as a CD player to a recording apparatus such as an MD recorder/player, a character string corresponding to the program received from the reproducing apparatus can be edited by an editing means. The edited character string is recorded to the recording apparatus in such a manner that the character string corresponds to the program. Thus, a character string that is recorded to the recording apparatus does not depend on a character string received from the reproducing apparatus. Consequently, the user can change a character string in a desired format.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 5 is a table showing the structure of sector 0 of an U-TOC area for managing a record position of each program;

FIG. 6 is a schematic diagram showing a link state of pieces of data dispersedly recorded in a program area of a rewritable magnetic optical disc;

FIG. 7 is a table showing the structure of sector 1 of the U-TOC area for managing a title name of each program recorded in a first character format;

FIG. 8 is a table showing the structure of sector 2 of the U-TOC area for managing the record date/time of each program;

FIG. 9 is a table showing the structure of sector 4 of the U-TOC area for managing a title name of each program recorded in a second character format;

FIG. 19 is a table showing subcode frames of an optical disc;

FIG. 26 is a title name selection screen on which a CD text is operated.

DETAILED DESCRIPTION OF THE PREFERRED EMBODIMENTS

Figure 1:
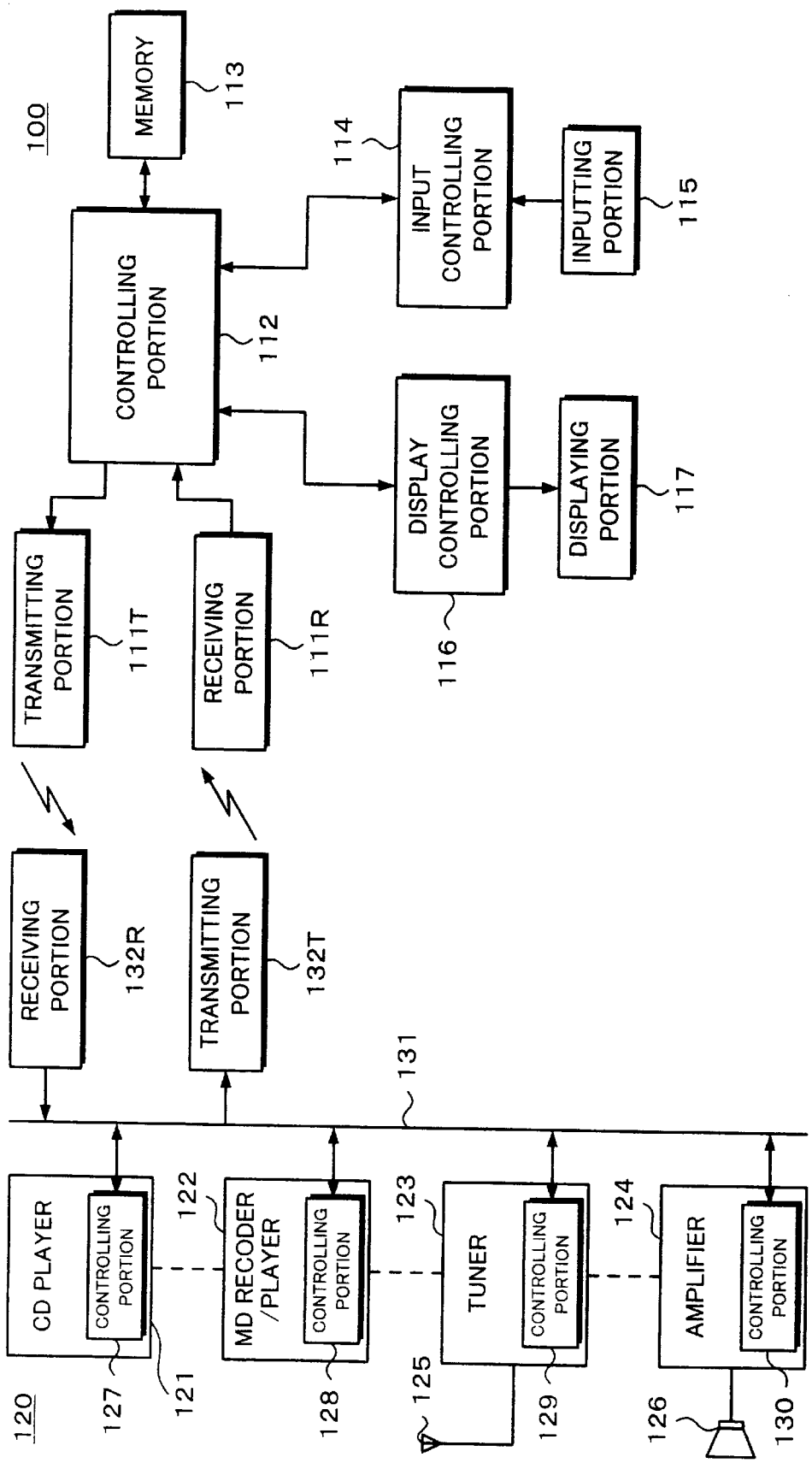
FIG. 1 is a block diagram showing the overall structure of a digital signal recording apparatus and a remote controlling apparatus according to the present invention.

Next, with reference to the accompanying drawings, an embodiment of the present invention will be described. The embodiment of the present invention is applied to an audio signal reproducing system. FIG. 1 shows a block diagram of the audio signal reproducing system. In FIG. 1, a remote controlling commander is denoted by reference numeral 100. An audio system that is controlled by the commander 100 is denoted by reference numeral 120. The audio system is composed of a CD player 121, an MD recorder/player 122 (that has both a recording function and a reproducing (playback) function), a tuner 123, and an amplifier 124.

The CD player 121 can reproduce character information such as a CD text from a CD text format CD. When the tuner 123 receives an FM multiplexed audio broadcast signal, it can extract character information therefrom. A reception antenna of the tuner 123 is denoted by reference numeral 125. A speaker 126 is connected to the amplifier 124. A reproduced signal of the CD player 121, a reproduced signal of the MD recorder/player 122, or a received signal of the FM tuner 123 is selected. The selected signal is reproduced by the speaker 126.

The audio system 100 has a bidirectional control signal bus line 131. A controlling portion 127 of the CD player 121, a controlling portion 128 of the MD recorder/player 122, a controlling portion 129 of the tuner 123, and a controlling portion 130 of the amplifier 124 are connected to the control signal bus line 131. In addition, a receiving portion 132R that receives a signal from the commander 100 and a transmitting portion 132T that transmits a signal to the commander 100 are connected to the control signal bus line 131. An audio signal as an analog signal and/or a digital signal is exchanged among each structural element of the audio system 120 as denoted by dashed lines of FIG. 1. In the embodiment shown in FIG. 1, although a control signal and an audio signal are separately transmitted, when a proper interface such as IEEE (Institute of Electrical and Electronics Engineers) 1394 is used, it is not necessary to separate the control signal and the audio signal.

The transmitting portion 111T and the receiving portion 111R of the commander 100 can transmit and receive a signal to/from the receiving portion 132R and the transmitting portion 132T of the audio system. The transmitting portion 111T and the receiving portion 111R are connected to a controlling portion 112 of the commander 100. The controlling portion 112 stores data necessary for a memory 113 connected to the controlling portion 112. An inputting portion 115 is connected to the controlling portion 112 through an input controlling portion 114. In addition, a displaying portion 117 is connected to the controlling portion 112 through a display controlling portion 116.

Figure 2:
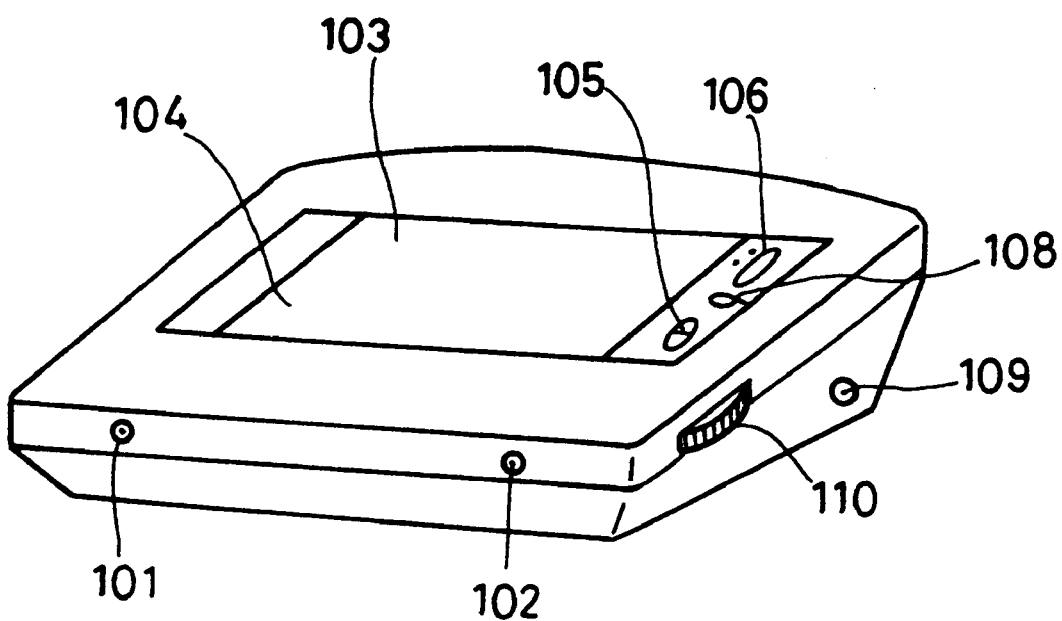
FIG. 2 is an external view showing the structure of the remote controlling apparatus according to the present invention.

FIG. 2 is an external view showing the structure of the commander 100. The commander 100 comprises a commander off button 101, a sleep button 102, a displaying portion 104, a touch panel portion 103, a volume adjusting button 105, a jog dial knob 106, a muting button 108, a contrast adjusting knob 109, and a brightness adjusting dial 110. The touch panel portion 103 is additionally disposed to the displaying portion 104. On the rear side of the commander 100 shown in FIG. 2, a power supply button and a transmitting/receiving portion that transmits/receives an infrared ray or the like are disposed. Information such as a user's command, a control signal, character codes, and so forth is exchanged between the transmitting/receiving portion and a transmitting/receiving unit as the receiving portion 132R and the transmitting portion 132T of the audio system 120 shown in FIG. 1.

The commander off button 101 is used to prohibit the commander 100 from transmitting user's commands to the audio system 120. The sleep button 102 is used to cause the audio system 120 to enter the sleep mode. The displaying portion 104 is for example an LCD (Liquid Crystal Display).

The touch panel portion 103 is composed of a plate having a resistor film, an electrostatic film, or the like. On the touch panel portion 103, the resistance varies corresponding to the two-dimensional position. When the user touches the surface of the touch panel portion 103 with a predetermined inputting means such as a touch pen, a signal for a particular command corresponding to the touched position is generated. Since the touch panel portion 103 fully covers the upper surface of the displaying portion 104, optical characteristics such as transmissivity of light should satisfy predetermined conditions so that the visibility of the displaying portion 104 does not deteriorate.

Since the touch panel portion 103 and the displaying portion 104 of the commander 100 are disposed in such a manner that the above-described relation of the positions thereof is satisfied, the user can know a position that he or she should touch on the touch panel portion 103 corresponding to data displayed on the displaying portion 104. Data is displayed on the displaying portion 104 with GUI (Graphical User Interface) that is software stored in a predetermined storing means of the commander 100. The touch panel portion 103 and the displaying portion 104 correspond to the displaying portion 117 and the inputting portion 115 shown in FIG. 1.

The volume adjustment button 105 is used to adjust the volume level of audio sound that is reproduced. The jog dial knob 106 is used as a selecting/deciding means as with an input pen. In the commander 100, the jog dial knob 106 is used to select an item for a user's command (for example, a program to be reproduced). The muting button 108 is used to muffle an audio output in the reproducing mode. The contrast adjustment knob 109 is used to adjust the contrast of the screen of the displaying portion 103. The brightness adjustment dial 110 is used to adjust the brightness of the screen of the displaying portion 103.

In the embodiment, when a desired program that can be reproduced by the CD player 121 is recorded to an MD of the MD recorder/player 122, with reference to a CD text reproduced by the CD player 121, character information corresponding to the program to be recorded is copied or edited/recorded to the U-TOC area of the MD. Such character information can be edited by the commander 100. Character information decided by the commander 100 is transmitted to the audio system 120 and then recorded in the U-TOC area of the MD.

Figure 3:
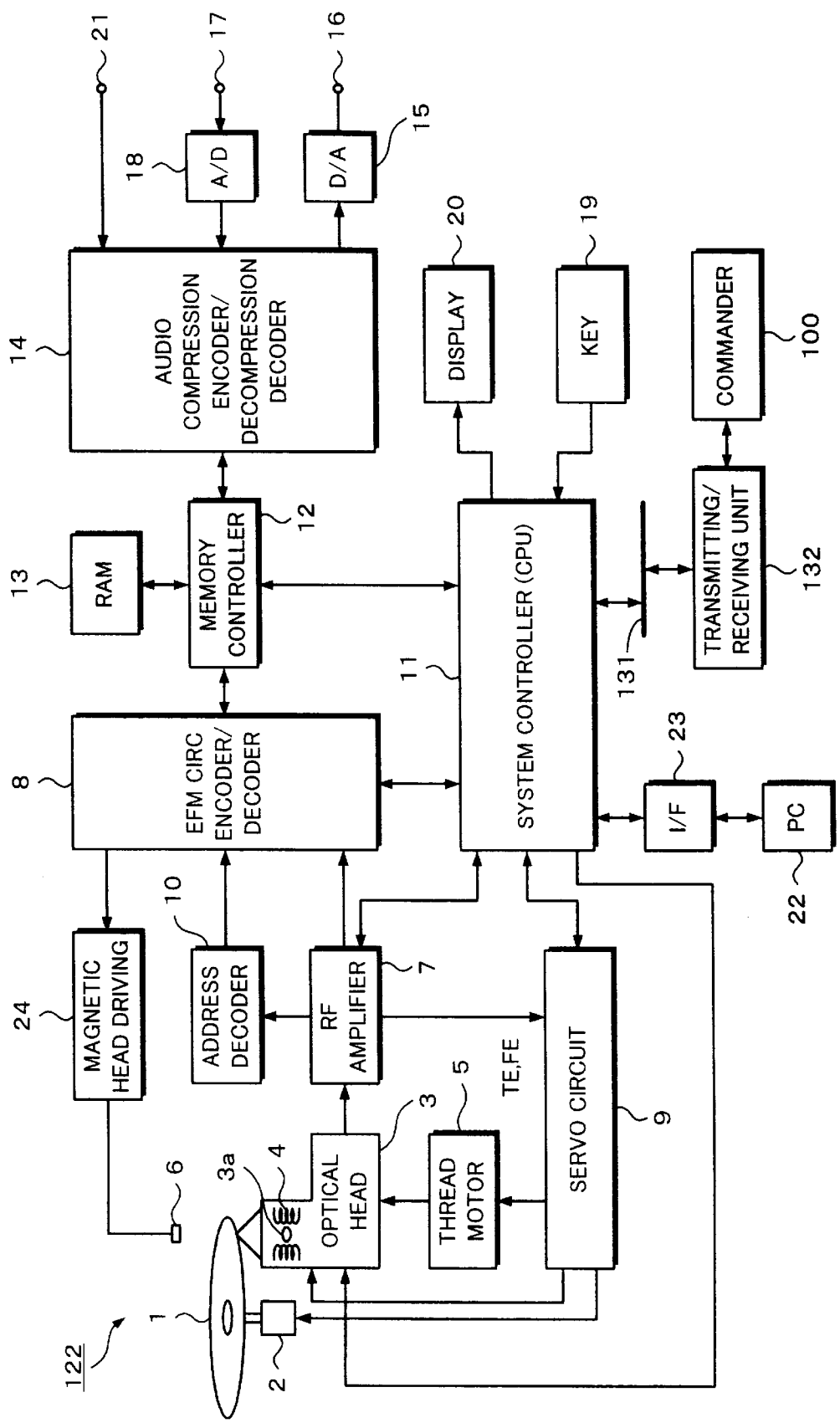
FIG. 3 is a block diagram showing a rewritable magnetic optical disc recording/reproducing apparatus.

For easy understanding of the embodiment of the present invention, the data structure of the U-TOC area of the MD recorder/player 122 and the MD will be described. FIG. 3 is a block diagram showing the overall structure of the MD recorder/player 122. The diameter of an MD is as small as 64 mm in comparison with 120 mm of a CD. An MD is a magnetic optical disc that is superior to a CD in portability. The MD recorder/player 122 receives a user's command through the commander 100 and transmits information concerned with an MD loaded therein to the commander 100.

An MD 1 is housed in a cartridge with a shutter mechanism. When information is recorded to the MD 1 or reproduced therefrom, the shutter mechanism is opened. In this state, light emitted by an optical pickup is radiated to the MD 1. In addition, a magnetic field generated by a magnetic head is applied to the MD 1. When the MD 1 is loaded to the MD recorder/player 122 in the recording mode, the reproducing mode, or the like, the MD 1 is rotated at CLV (Constant Linear Velocity) by a spindle motor 2. An optical head 3 and the magnetic head 6 are disposed in the MD recorder/player 122 in such a manner that the optical head 3 and the magnetic head 6 are oppositely positioned with the MD 1. A thread motor 5 is disposed in the MD recorder/player 122. The thread motor 5 travels the optical head 3 in the radial direction of the MD 1. The optical head 3 is composed of an objective lens 3a, a two-axis mechanism 4, a semiconductor laser (not shown), and a light receiving portion (not shown). The intensity of laser light emitted from the semiconductor laser is varied between the recording mode and the reproducing mode. The light receiving portion is composed of a plurality of areas.

The light receiving portion receives light of which the laser light emitted by the semiconductor laser is reflected by the MD 1 and generates detection signals of the individual areas thereof. The polarization of the reflected light varies corresponding to record information by magnetic Kerr effect. The light receiving portion detects a magnetic field vector corresponding to the variation of the polarization and generates a detection signal corresponding to the detected magnetic field vector. The two-axis mechanism 4 is composed of a focusing coil and a tracking coil. The focusing coil drives the objective lens 3a in the direction of which the objective lens 3a approaches the record surface of the MD 1 or goes away therefrom. The tracking coil drives the objective lens 3a in the radius direction of the MD 1.

Next, the structures and operations of a data reproducing system, a servo system, and a portion that processes a reproduced signal will be described. The detection signals generated by the light receiving portion of the optical head 3 are supplied to an RF amplifier 7. The RF amplifier 7 generates a focus error signal FE, a tracking error signal TH, an RF signal, and a spindle error signal corresponding to the detection signals. The focus error signal FE and the tracking error signal TH are supplied to a servo circuit 9. The RF signal is supplied to an EFM/CIRC encoder/decoder 8 and an address decoder 10. The spindle error signal is supplied to a system controller 11.

The servo circuit 9 compensates the phases of the signals received from the RF amplifier 7 and adjusts the gains thereof. Output signals of the servo circuit 9 are supplied to the focusing coil and the tracking coil of the two-axis mechanism 4 through a drive amplifier (not shown).

The servo circuit 9 has an LPF (Low Pass Filter) (not shown). The tracking error signal TH is supplied to the LPF. Corresponding to the output signal of the LPF, a thread error signal is generated. The thread error signal is supplied to the thread motor 5 through a thread drive amplifier (not shown). The thread motor 5 operates corresponding to the thread error signal.

The EFM/CIRC encoder/decoder 8 performs the following processes corresponding to the RF signal received from the RF amplifier 7. The EFM/CIRC encoder/decoder 8 converts the RF signal into a binary signal and demodulates the binary signal by EFM (Eight to Fourteen Modulation) demodulating process. The EFM demodulating process is a demodulating process for record data that has been EFM-modulated. In addition, the EFM/CIRC encoder/decoder 8 performs an error correcting process corresponding to CIRC (Cross Interleave Reed-Solomon Coding) method for the resultant signal.

Thus, the EFM/CIRC encoder/decoder 8 generates a spindle error signal for controlling the rotation of the MD 1 corresponding to the binary signal based on the RF signal or corresponding to address data extracted by the address decoder 10 and supplies the spindle error signal to the system controller 11. The system controller 11 controls the spindle motor 2 corresponding to the spindle error signal. The system controller 11 corresponds to the controlling portion 127 shown in FIG. 1. The EFM/CIRC encoder/decoder 8 controls the operation of a PLL (Phase Locked Loop) thereof corresponding to the binary EFM signal.

The EFM/CIRC encoder/decoder 8 supplies the resultant decoded signal to a memory controller 12. As will be described later, the memory controller 12 writes the output signal of the EFM/CIRC encoder/decoder 8 to a RAM (Random Access Memory) 13 under the control of the system controller 11. In addition, the memory controller 12 reads a signal from the RAM 13.

The signal that is read from the RAM 13 is supplied to an audio compression encoder/decompression decoder 14. The audio compression encoder/decompression decoder 14 decompresses the received signal that has been compressed corresponding to for example ATRAC (Acoustic TRansferred Adopted Coding) method. The decompressed signal is supplied to a D/A converter 15. The D/A converter 15 converts the received digital data into an analog audio signal. The analog audio signal is supplied to an audio output terminal 16.

As will be described later, grooves have been formed on the MD 1 in a zigzag pattern at a predetermined frequency (for example, 22.05 Hz). Address data that had been FM-modulated has been recorded on the MD 1. The address data decoder 10 extracts the address data corresponding to the RF signal received from the RF amplifier 7. A BPF (Band Pass Filter) that allows only a predetermined frequency to pass is disposed in the address data decoder 10. By FM-demodulating the RF signal received from the BPF, the address data is extracted. The extracted address data is supplied to the EFM/CIRC encoder/decoder 8. Next, the processes performed by the memory controller 12 will be described in detail. The output signal of the EFM/CIRC encoder/decoder 8 is written to the RAM 13 at a transmission rate of for example, 1.4 Mbits/sec. When the amount of the signal written to the RAM 13 exceeds a predetermined value, the signal is read from the RAM 13 at a lower transmission rate of for example, 0.3 Mbits/sec than the transmission rate in the data writing mode. Since the reproduced signal is temporarily stored to the memory and then output as audio data, the audio data can be prevented from being lost even if a track jump due to an external disturbance (such as vibration) takes place.

When a track jump due to an external disturbance such as vibration takes place, a process for moving the optical head 3 to the address at which such a track jump has taken place is performed. While such a process is being performed, the memory controller 12 reads the signal from the RAM at the low transmission rate and outputs the resultant audio data. Thus, even if the data reproduction from the MD 1 is stopped due to a track jump, when the period of the track jump is less than a predetermined value, the audio data can be prevented from being lost. When the RAM 13 has a storage capacity of for example 4 Mbytes, it can store audio data of up to around 10 seconds. The memory controller 12 is controlled by the system controller 11.

Next, the structure and operation of the recoding system will be described. An analog audio signal reproduced from the CD player 12, an audio signal received by the tuner 123, and so forth are supplied to an A/D converter 18 through an audio input terminal 17. The A/D converter 18 converts the received analog signal into a digital signal. The digital signal is supplied to the audio compression encoder/decompression decoder 14. When a digital signal received from a digital output terminal of a digital reproducing apparatus is input, the digital signal is supplied to the audio compression encoder/decompression decoder 14 through a digital input terminal 21.

The audio compression encoder/decompression decoder 14 compresses the received digital signal corresponding to a predetermined compressing method such as ATRAC method. The compressed digital signal is temporarily stored in the RAM 13 through the memory controller 12 at a transmission rate of for example 0.3 Mbits/second. When the memory controller 12 detects that a predetermined amount of the digital signal has been stored in the RAM 13, the memory controller 12 allows the digital signal to be read from the RAM 13.

The digital signal that is read from the RAM 13 is supplied to the EFM/CIRC encoder/decoder 8. The EFM/

CIRC encoder/decoder 8 performs the EFM modulating process and the error correcting process corresponding to CIRC encoding method for the digital signal and supplies the resultant signal to a magnetic head driving circuit 24. The magnetic head driving circuit 24 drives an N pole or an S pole of the magnetic head 6 corresponding to the received signal. In addition, the power of the light emitted by the semiconductor laser of the optical head 3 is controlled so that it becomes higher than in the reproducing mode. The surface of the MD 1 is heated up to Curie temperature so that the magnetic field is inverted. In this state, the data is recorded.

The system controller 11 performs various controlling processes concerned with the recording/reproducing operations. For the recording/reproducing operations, the system controller 11 controls the signal process performed by the memory controller 12 with the RAM 13, the spindle motor 2 corresponding to the spindle error signal received from the EFM/CIRC encoder/decoder 8, and the encoder/decoder controlling process for the EFM/CIPC encoder/decoder 8.

In addition, the system controller 11 transmits various servo commands to the servo circuit 9 corresponding to user's operations performed through a key portion 19, the commander 100, or the like. Moreover, the system controller 11 causes a displaying portion 20 such as an LCD to display predetermined information such as character information. Examples of information displayed on the displaying portion 20 are still picture, time information (such as total reproduction time of the MD 1, elapsed time of a program that is being reproduced, remaining reproduction time of a program that is being reproduced, and remaining reproduction time of total reproduction time), and track information of a program that is being reproduced. When a disc name, a track name, a program name, and so forth have been recorded on the MD 1, they are also displayed on the displaying portion 20.

Examples of user's operations that are performed or input through the key portion 19 and the commander 100 are power on/off commands, cartridge eject command, playback command, pause command, stop command, program selection command, and record command. Information concerned with operations are input from the commander 100 and transmitted to the system controller 11 by a predetermined transmitting method using infrared rays or the like. Character information recorded in the U-TOC area of the MD 1 is transmitted from the commander 100 to the MD recorder/player 122. The MD recorder/player 122 has a transmitting/receiving unit 132 that receives information therefrom through the control signal bus line 131. In FIG. 1, the transmitting/receiving unit 132 is represented as the receiving portion 132R and the transmitting portion 132T.

A signal is transmitted from the MD recorder/player 122 to the commander 100 through the transmitting/receiving unit 132. Information that is transmitted from the MD recorder/player 122 to the commander 100 is for example information (that the user requires) corresponding to programs recorded on the MD 1. The MD recorder/player 122 may be for example an MD changer. In this case, information of a disc number of the MD 1 loaded to the MD changer is transmitted to the commander 100. When the user selects a program, he or she references such information. Such information is reproduced from a predetermined record area such as a P-TOC (Premastered TOC) area or the U-TOC area recorded on the MD 1. The detail of the P-TOC area will be described later. The reproduced information is supplied to the transmitting/receiving unit 132 by the system controller 11. The user may communicate with the system controller 11 through for example a personal computer 22 and an interface 23 as well as the key portion 19 and the remote controlling system. In this case, software that allows the personal computer 22 to communicate with the system controller 11 and information to be displayed on a monitor screen is required.

Each of the key portion 19, the commander 100, and so forth has a function that allows the user to record desired information such as a title of each program to the MD 1. The information that has been recorded on the MD 1 is displayed on the displaying portion 20 while the relevant program is being reproduced.

Information such as a title of each program is recorded in the U-TOC area of the MD 1. The U-TOC area is a record area that is different from a program area. As will be described later, the U-TOC area is composed of a plurality of sectors. In other words, information such as a title of each program is recorded to different sectors depending on whether or not character codes of the information are MS-JIS (Microsoft-Japanese Industrial Standards) codes (such as Kanji characters, Hiragana characters, and Katakana characters in two-byte character format) or ASCII (American Standard Code for Information Interchange) codes (such as alphabetic characters and Katakana characters in one-byte character format).

Figure 4:
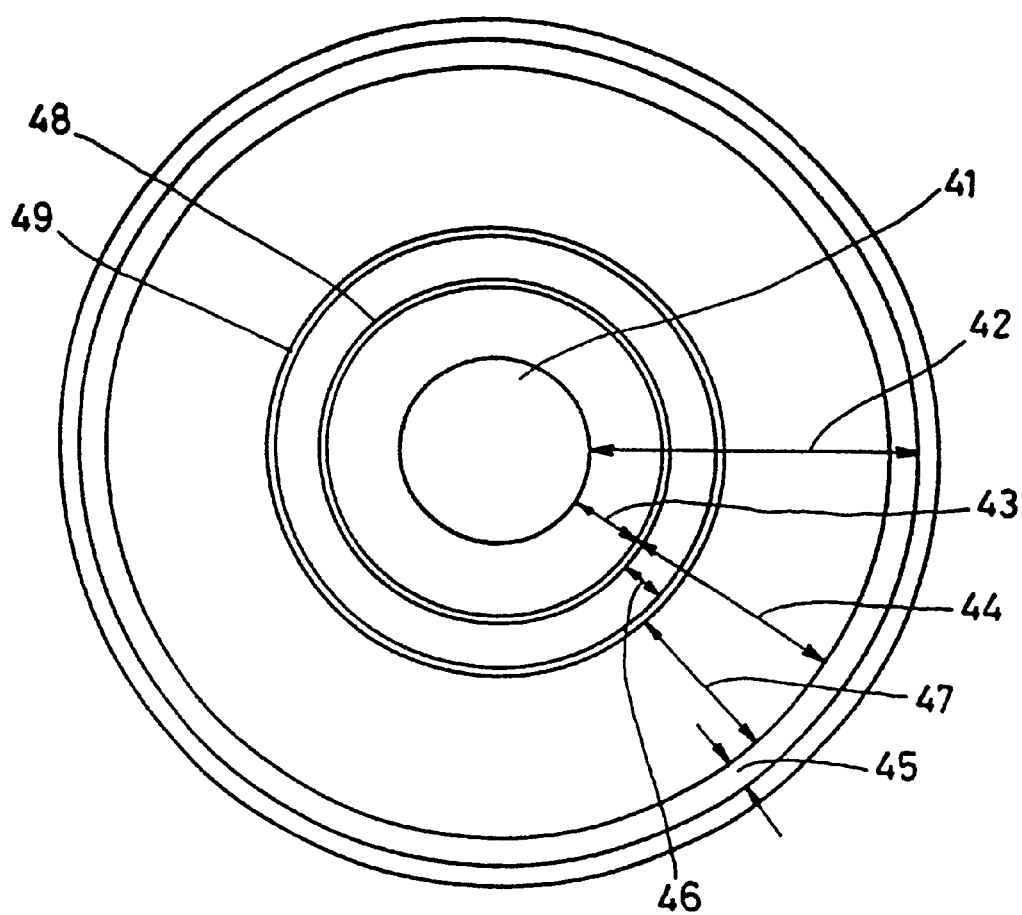
FIG. 4 is a schematic diagram showing the medium format of a rewritable magnetic optical disc.

Next, with reference to FIG. 4, the medium format of the MD 1 will be described. The MD 1 is composed of a polycarbonate substrate and an information film coated thereon. A clamping plate 41 composed of a magnetic substance is disposed at the center of the MD 1. The information film has a data record film and a data reproduction film. The data record film is composed of a dielectric layer, an MO (Magnetic Optical) layer, a dielectric layer, a reflection film, and a protection film that are disposed successively on the substrate. The data reproduction film is composed of a reflection film and a protection film. The area other than the clamping plate 41 of the MD 1 is an information area 42.

A lead-in area 43 is formed on the innermost periphery side of the information area 42. The data reproduction film is coated in the lead-in area 43. In the data reproduction film, information has been recorded as pits. A recordable area 44 is formed outside the lead-in area 43. The data record film is coated in the recordable area 44. A lead-out area 45 is disposed on the outermost periphery of the MD 1. A program area 47 for recording each program is formed outside the recordable area 44. A U-TOC area 46 for recording a U-TOC is formed on the inner periphery side of the recordable area 44. In the U-TOC area 46, information corresponding to each program recorded in the program area 47 is recorded.

A calibration area 48 is formed between the lead-in area 43 and the U-TOC area 46 (in other words, on the innermost periphery of the recordable area 44). The calibration area 48 is formed so as to adjust a laser output power in the recording mode. A gap area 49 is formed between the U-TOC area 46 and the program area 47. User data is not recorded in the calibration area 48 and the gap area 49.

A P-TOC has been recorded as pre-pits in the lead-in area 43. In the P-TOC, information such as the start address of the U-TOC area, the laser power value in the recording mode, and the start address of the calibration area 48 has been recorded.

To record/reproduce a program to/from the MD 1, management information (namely, the P-TOC and the U-TOC) that has been recorded on the MD 1 should be read. The system controller 11 determines an address of an area of the MD 1 to/from which a program is recorded/reproduced corresponding to the management information. The management information is read when the MD 1 is loaded to the MD recorder/player 122. The management information that has been read from the MD 1 is stored in a predetermined storing means such as a DRAM (not shown). When a program is recorded or reproduced, the management information is referenced.

When data is recorded or erased, the U-TOC is edited and rewritten. Whenever data is recorded/erased, the system controller 11 edits the UTOC stored in the predetermined storing means. The edited U-TOC is written to the U-TOC area 46 of the MD 1 at predetermined timing (in other words, when the eject command of the MD 1 or the power off command is input). Since the U-TOC information is temporarily stored in the storing means and managed, the storing period of the U-TOC information can be shortened in comparison with the case that the U-TOC information is recorded to the U-TOC area 4 of the MD 1 whenever the U-TOC information is rewritten. Thus, the performance of the apparatus can be improved. Alternatively, whenever the U-TOC information is rewritten, it may be recorded to the U-TOC area 46 of the MD 1.

For easy understanding of the U-TOC information managed in the U-TOC area 46, the data format of the program area 47 will be described. Data is recorded or reproduced as clusters. One cluster is composed of for example 36 sectors. One sector is composed of for example 2352 bytes. The 36 sectors consist of three linking sectors, one sub data sector, and 32 main data sectors.

The CIRC interleave length of the data format of the MD is larger than the length of one sector (for example, 13.3 msec) in the format of a conventional error correcting process used for a CD or the like. To allow one reproducing system to reproduce data recorded on both a CD and an MD, such linking sectors are provided. Thus, meaningful information is not recorded in the linking sectors. In addition, the sub data sector is reserved for a future expansion.

Two sectors are used as one group. One group is divided into for example 11 sound groups. One sound group is composed of for example 424 bytes of data of left and right channels. 11 sound groups are referred to as one sound frame.

As described above, the U-TOC information is table-of-content information for managing each program recorded in the program area 47. Next, the U-TOC area 46 for recording the U-TOC will be described. The UTOC area 46 is composed of for example 32 sectors. Next, sectors 0, 1, 2, and 4 of the 32 sectors will be described. Sectors 3 and 5 to 32 are reserved for future expansions.

Sector 0 is used to manage the start address and end address of each program recorded in the program area 47, copy protect information, and emphasis information. FIG. 5 shows an example of the structure of sector 0. Each of sectors 0, 1, 2, and 3 is composed of 2352 bytes arranged as 588 four-byte slots. The 588 four-byte slots are identified slot 0 to slot 587. In slot 0 to slot 77, a header portion, a cluster H, a cluster L, a maker code, a model code, a first TNO, a last TNO, a sector in-use state, a disc serial number, and a disc ID are successively recorded. The cluster H and the cluster L represent predetermined addresses. The maker code and the model code represent a manufacturer name and a model name of the disc, respectively. The first TN0 and the last TN0 represent the first and last program numbers, respectively.

In addition, a P-DFA (Pointer for Defective Area), a P-EMPTY (Pointer for Empty slot), a P-FRA (Pointer for FReely Area), and a relevant table representation data portion are successively recorded. The P-DFA represents the start position of a slot for storing information concerned with the position of a defect that takes place on the MD 1. The P-EMPTY represents the in-use state of a slot. The P-FRA represents the start position of a slot for managing a recordable area. The relevant table representation data portion is composed of P-TNO1, P-TNO2, . . . , and P-TNO-255 that represent the start positions of slots corresponding to the individual program numbers.

Slot 78 to slot 587 are slots pointed by the above-described various pointers. Each slot is composed of four bytes. Each slot is used to manage a start address, an end address, a track mode, and link information.

In the MD recorder/player according to the present invention, data is not always sequentially recorded on the MD, which is a record medium. In other words, data dispersedly recorded on a record medium can be correctly reproduced. Next, a process for correctly reproducing data dispersedly recorded on a record medium will be described. As described above, data is temporarily stored in the RAM 13. Moreover, in the RAM 13, the data write rate is larger than the data read rate. Thus, the reproducing system can perform the following data processes.

The optical pickup 6 is successively accessed to data that has been dispersedly recorded on the disc. Corresponding to the reproduced signal, the EFM/CIRC encoder/decoder 8 generates reproduced data. The reproduced data is stored in the RAM 13. When data is read from the RAM 13, the data is sequentially arranged and supplied to the audio compression encoder/decompression decoder 14.

Next, a process for correctly connecting data that has been dispersedly recorded will be described.

This process is performed with reference to the P-FRA in sector 0 of the U-TOC. FIG. 6 shows the case that 03h (where h represents hexadecimal notation) is recorded in the P-FRA. In this case, as shown in FIG. 6, slot 03h is accessed. A start address and an end address recorded in slot 03h represent a start address and an end address of one part recorded on the disc.

Link information recorded in slot 03h represents an address of a slot to be continued. In FIG. 6, the address of the slot to be continued from slot 03h is 18h. Thus, slot 18h is accessed. Since link information recorded in slot 18h is 1Fh, slot 1Fh is accessed. Corresponding to link information of slot 1Fh, slot 2Bh is accessed. Corresponding to link information of 2Bh, slot E3h is accessed. Until link information of a slot to be continued becomes null (namely, 00h), link information is successively traced.

In such a manner, addresses of data that has been dispersedly recorded are successively obtained. The MD recorder/player 122 controls the optical pickup 6 and successively accesses such addresses on the MD 1.

Thus, when the MD recorder/player 122 reads data from the RAM 13, the MD recorder/player 122 can connect data that has been dispersedly recorded.

In the above-described process, data that has been dispersedly recorded is connected with reference to the P-FRA. Alternatively, data that has been dispersedly recorded can be connected with reference to the P-DFA, the P-EMPTY, or the P-TNO1, P-TNO2, . . . , and P-TNO-255.

In sector 1 of the U-TOC area 46, titles of all programs recorded in the program areas 47 and a disc title of the MD 1 are managed. When programs recorded on the MD 1 are audio data, the disc title of the MD 1 is an album title, information concerned with a performer, and so forth. The titles of the individual programs are song names. FIG. 7 shows an example of the structure of sector 1 of the U-TOC area 46.

Character information of each program is recorded in a slot of the character table portion corresponding to the relevant table representation data P-TNAx (where x=1 to 255). When the number of characters is large, a plurality of slots are linked with link information. In sector 1 of the U-TOC area 46, titles are managed with alphabetic characters.

However, when the user designates Katakana character input mode, a special code "^" is automatically generated. The alphabetic characters are surrounded by a pair of special codes "^" and managed in sector 1. The alphabetic characters surrounded with a pair of special codes "^" are converted into Katakana characters with a conversion table. With the conversion table, for example, "^a^" is converted into ア (Katakana character).

FIG. 8 shows an example of sector 2 of the UTOC area 46. Sector 2 is used to manage record date/time of each program recorded in the program area 47. FIG. 9 shows an example of sector 4 of the U-TOC area 46. In sector 4, titles of individual programs recorded in the program area 47 can be displayed in Kanji characters, Hiragana characters, and/or Katakana characters.

The process for inputting character information such as a title to sector 1 or sector 4 of the U-TOC area is performed with the commander 100 (see FIG. 2).

Figure 10:
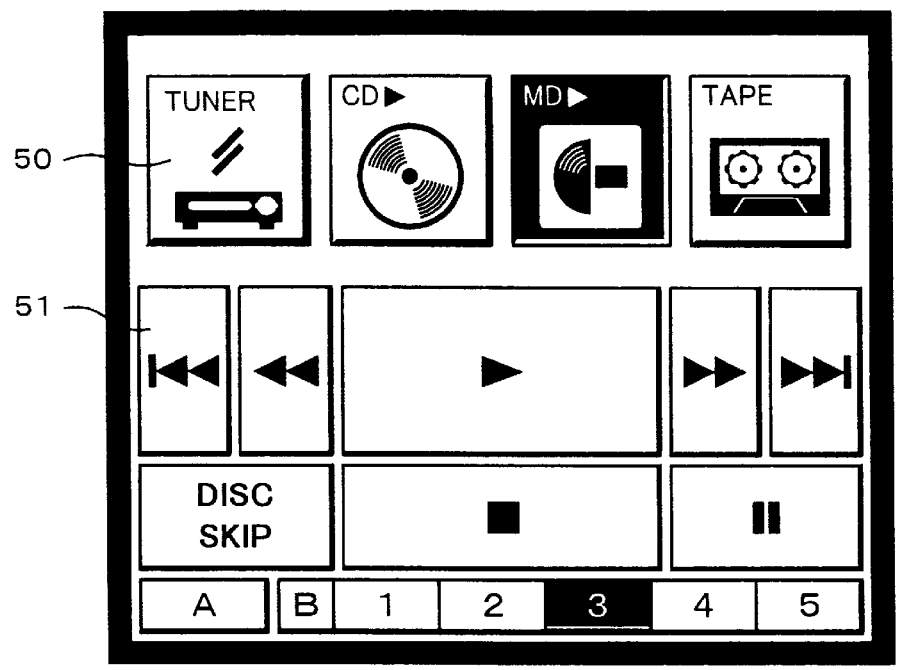
FIG. 10 is a schematic diagram showing a display screen on which each recording/reproducing apparatus is controlled with the remote controlling apparatus.

Next, with reference to examples of screens displayed on the displaying portion 104 (displaying portion 117 shown in FIG. 1), a process for inputting character information such as a title will be practically described. FIG. 10 shows a screen for selecting an object to be controlled. The audio system includes the CD player 121, the MD recorder/player 122, the tuner 123, and/or a tape recorder (not shown in FIG. 1). Thus, the commander 100 can control these units. On the screen shown in FIG. 10, the user touches a desired one of icons of units with the touch pen or the like.

Figure 11:
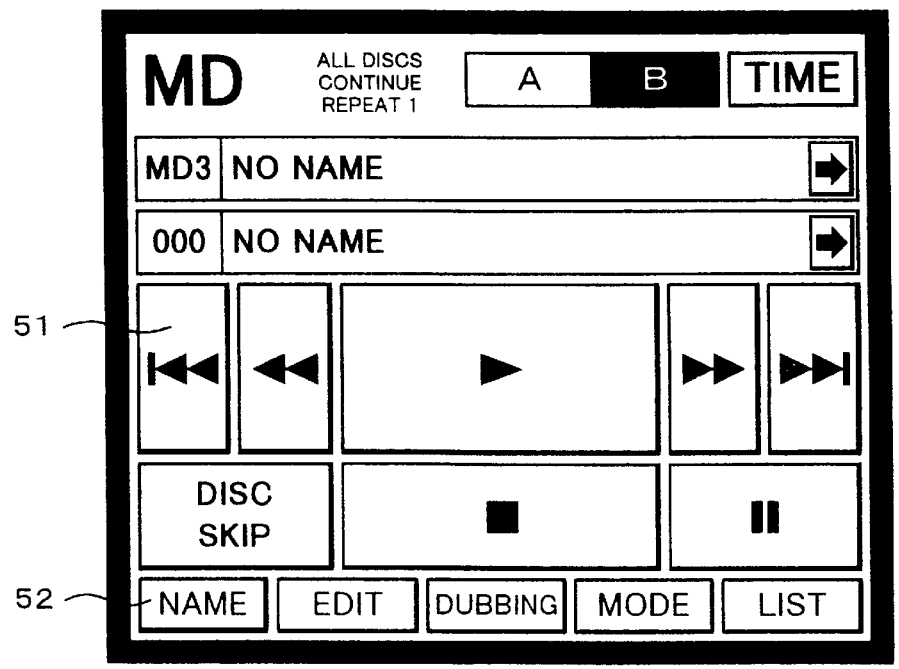
FIG. 11 is a schematic diagram showing a title display screen on which a rewritable magnetic optical disc is operated.

Next, a process performed in the case that the MD recorder/player 122 has been selected as an object to be controlled will be described. When the icon for the MD recorder/player 122 has been selected, a screen shown in FIG. 11 is displayed. On the screen shown in FIG. 11, the user can select for example a playback start command, a program skip command, a playback stop command, a pause command, and a disc skip command as playback commands with the touch panel portion 103. In other words, icons 51 for these commands are displayed on the touch panel portion 103. When the user touches a desired icon 51 on the touch panel portion 103, a command corresponding to the touched icon is transmitted to the MD recorder/player 122. The icons for the playback commands are shown at the center to lower regions of the touch panel portion 103.

As shown in FIG. 11, icons for the other commands of the MD recorder/player 122 (other than the playback commands) are displayed in a lower region of the touch panel portion 103. Examples of these commands are a character input command, an edit command for a cut and paste process for each program (audio information), a dubbing command for recording information of another record medium, a mode selecting command for selecting a playback order of programs (such as a repetitive playback mode or a random playback mode), and a list command for displaying available programs in a list format.

Figure 12:
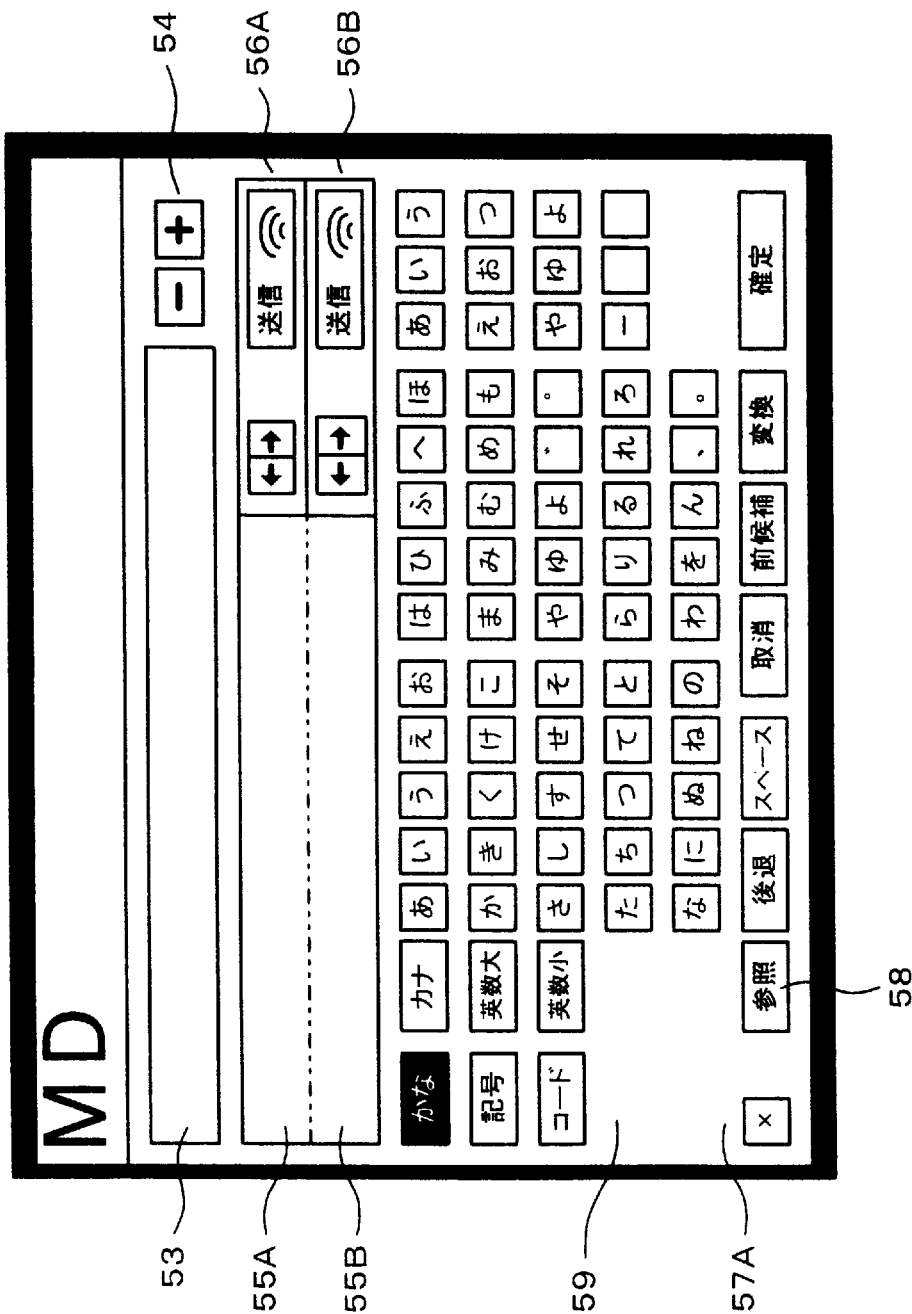
FIG. 12 is a schematic diagram showing a title name input screen on which a rewritable magnetic optical disc is operated.

Since the present invention features a character input function, a process performed in the case that the user touches the icon "NAME" 52 at a lower left position of the screen shown in FIG. 11 and selects the character input function will be described. FIG. 12 shows an example of the character input screen. On the character input screen, "MD" is displayed at the upper left corner thereof. "MD" represents that the MD recorder/player 122 has been selected as an object to be controlled. A display field 53 just below "MD" shows a track name, a disc name, and so forth that are read from the P-TOC area. "+" and "−" icons 54 on the right of the display field 53 are used to increment/decrement a track number for a desired track. With the selected track number, a desired program can be selected from programs recorded in the program area 47 so as to record character information with the character input function.

At a lower region of the display field 53, a two-line character input field (editing fields 55A and 55B) is displayed. One of the two lines of the character input field (for example, the editing field 55A) shows character information to be recorded to sector 4 of the U-TOC area. The other line (for example, the editing field 55B) shows character information to be recorded to sector 1 of the U-TOC area. Thus, in the above-described structure of the U-TOC area, one line (for example, the editing field 55A) is used to input Kanji characters, Hiragana characters, and/or Katakana characters (in two-byte character format) whereas the other line (for example, the editing field 55B) is used to input alphabetic characters and/or Katakana characters (in one-byte character format).

In the commander 100, the displaying portion 104 has the above-described two-line character input field (the editing fields 55A and 55B). Thus, the user can see input characters for sectors 1 and 4 of the U-TOC area at a time. After confirming the relation of the characters in the two character formats, the user can cause the commander 100 to transmit the input characters to the MD recorder/player. The user can freely designate the relation between characters that are input to the two lines of the character input field. For example, the first line may be used to input a music program title with alphabetic characters, whereas the second line may be used to input the equivalent music program title with Japanese characters. Alternatively, the first line may be used to input a title name, whereas the second line may be used to input an artist name. At a right region of the two-line character input field (the editing fields 55A and 55B), icons 56A and 56B for commands for transmitting characters in the individual lines of the character input field are displayed. When the user touches these icons 56A and 56B, the characters in the first line of the character input field and the character in the second line thereof are recorded to sector 1 and sector 4 of the U-TOC area, respectively.

Alternatively, several program titles in a plurality of formats may be input on one screen. In this case, a plurality of two-line character input fields (editing fields 55A and 55B) may be displayed on the displaying portion 104.

The user inputs characters with the touch panel function by referencing an icon 57A displayed at a lower region of the displaying portion 104 shown in FIG. 12 (the icon 57A is similar to a keyboard for use with a wordprocessor or the like) (the icon 57A is hereinafter referred to as software keyboard). In FIG. 12, the software keyboard 57A is used to input Hiragana characters. With the software keyboard for Hiragana characters, when the user touches an icon 変換 (conversion)" at a lower region of the software keyboard 57A, he or she can convert Hiragana characters into Kanji characters. As described above, Hiragana characters and Kanji characters that are input on the screen shown in FIG. 12 are recorded to sector 4 of the U-TOC area. In addition, when the user touches one of icons 59 かな (Hiragana characters)", カナ (Katakana characters)", 記号 (Symbolic characters)", 英数大 (Uppercase alphabetic characters)", コード (Codes)", or 英数小 (Lowercase alphabetic characters)" at a left region of the screen, he or she can select the relevant character format.

Figure 13:
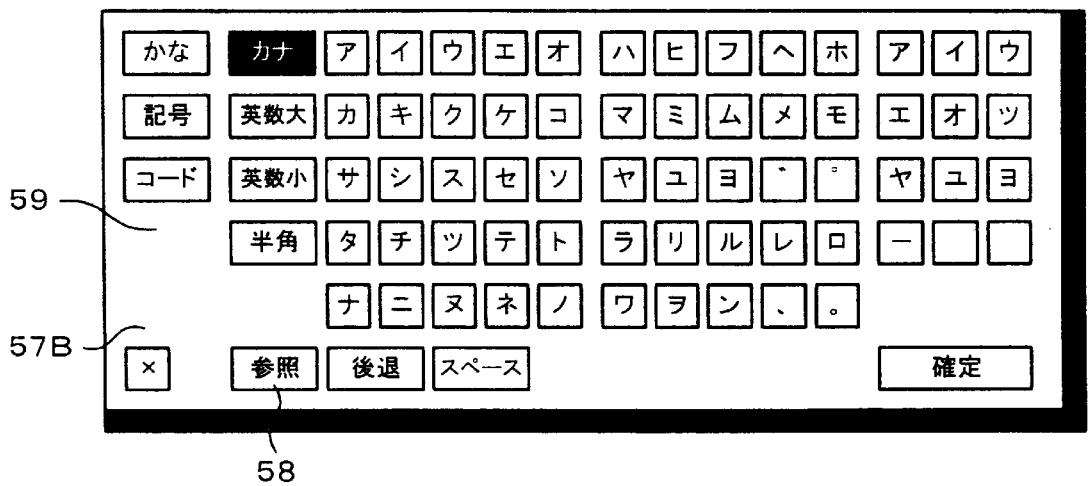
FIG. 13 is a schematic diagram showing a software keyboard displayed in the case that a "Kana character" display mode has been selected as a character input screen.

FIG. 13 shows an example of a software keyboard 57B displayed in the case that the user touches the icon 59 カナ. The software keyboard 57B is used to input Katakana characters in two-byte character format. Katakana characters in two-byte character format are recorded to sector 4 of the U-TOC area. On the other hand, Katakana characters in one-byte character format are recorded to sector 1 of the U-TOC area.

Figure 14:
FIG. 14 is a schematic diagram showing a software keyboard displayed in the case that an "Uppercase alphabetic character" display mode has been selected as a character input screen.
Figure 15:
FIG. 15 is a schematic diagram showing a software keyboard displayed in the case that a "Lowercase alphabetic character" display mode has been selected as a character input screen.
Figure 16:
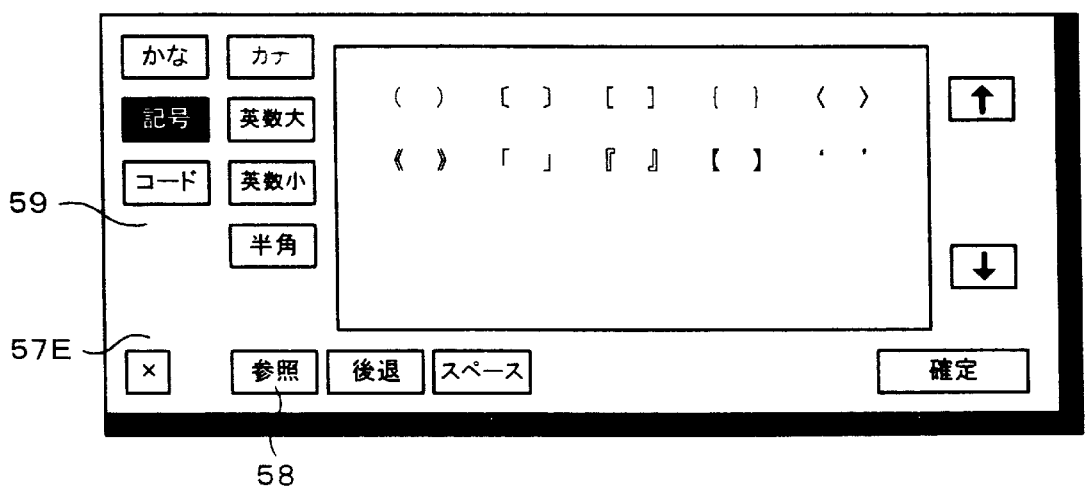
FIG. 16 is a schematic diagram showing a software keyboard displayed in the case that a "Symbolic character" display mode has been selected as a character input screen.

FIG. 14 shows an example of a software keyboard 57C displayed in the case that the user touches the icon 59 英数大 FIG. 15 shows an example of a software keyboard 57D displayed in the case that the user touches the icon 59 英数小 FIG. 16 shows an example of a software keyboard 57E displayed in the case that the user touches the icon 59 記号 Uppercase alphabetic characters, lowercase alphabetic characters, and symbolic characters are recorded to sector 1 of the U-TOC area.

In the above-described embodiment, characters are separately input to two lines of the character input field (the editing fields 55A and 55B). When characters in a first character format are input to one line of the character input field, they may be automatically converted into equivalent characters in a second character format and then the characters in the second format may be input to the other line of the character input field.

According to the above-described embodiment of the present invention, when the MD recorder/player 122 dubs music program information reproduced by for example the CD player 121 to an MD, in addition to the music program information, title information such as a disc name and a program name are recorded to the MD with reference to information of a CD text or the like. Thus, the above-described character input operation for an MD can be omitted or simplified. Such a function is referred to as reference mode. To enter the MD recorder/player 122 into the reference mode, the user presses an icon 58 参照 (reference)" at a lower region of the software keyboard in the character input mode (see FIG. 12).

Next, in addition to the structure of the CD player 121 that generates character information, the CD text will be described. The CD text is additional character information that is recorded in the TOC area of a CD. As a known function, character information such as a disc name and a program name that the user has input is stored in a memory of the CD player 121. In this function, when the relevant CD is loaded to the CD player 121, the disc name and the program name are displayed. This function is referred to as custom file function. With the above-described function, character information generated by the CD player 121 can be recorded to an MD in the reference mode. In addition, character information generated by other than the CD player 121 can be recorded to an MD in the reference mode. For example, in the case that the tuner 123 decodes character information from a broadcast signal such as an audio multiplexed broadcast signal or a digital audio broadcast signal, when the broadcast signal is received and recorded to an MD, character information received from the tuner 123 can be recorded to the MD. Of course, when a program reproduced by another MD recorder/player is recorded to an MD by the MD recorder/player 122, character information corresponding to the program can be recorded to the MD. Moreover, an apparatus such as a CD changer or an MD changer that can load many discs and reproduces a program from a selected disc may be used.

Figure 17:
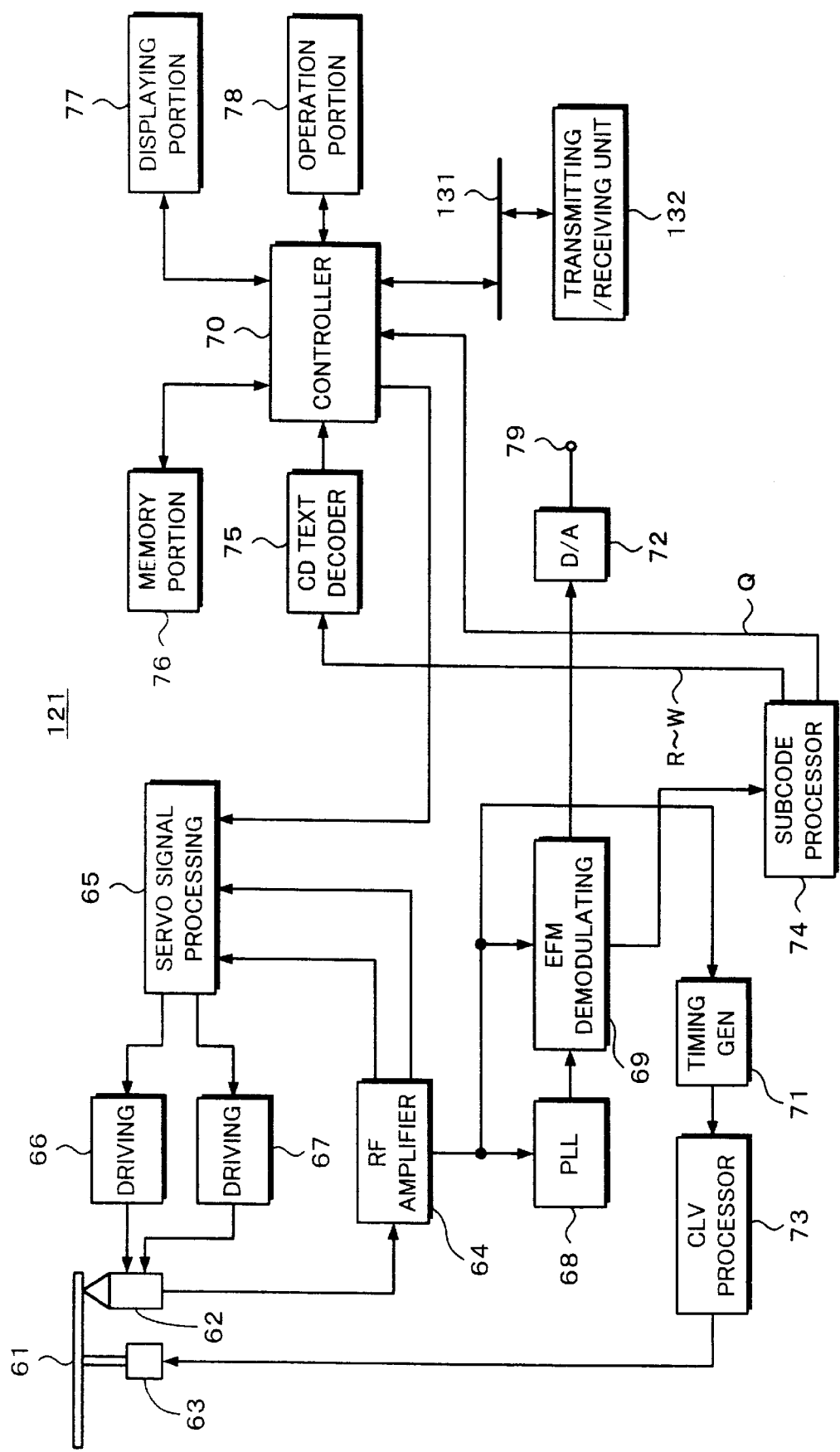
FIG. 17 is a block diagrams showing the structure of an optical disc reproducing apparatus.

FIG. 17 shows an example of the structure of a CD player 121 having a CD text function. The CD player 121 can reproduce additional character information from a management lead-in area of the CD in a CD text format. Referring to FIG. 17, a CD 61 from which a program is reproduced is rotated and driven by a spindle motor 63. An optical pickup 62 reads a program recorded on the CD 61.

An output signal of the optical pickup 62 is supplied to an RF amplifier 64. The RF amplifier 64 has an RF signal processing circuit that digitizes the RF signal and generates a tracking error signal TH and a focus error signal FE. The error signals THE and FE are supplied to a servo signal processing circuit 65. The servo signal processing circuit 65 performs a focus controlling process and a tracking controlling process. A focus actuator and a tracking actuator in the optical pickup 62 are driven corresponding to signals received from driving circuits 66 and 67, respectively. A unit (not shown) that moves the pickup 62 in the radial direction of the disc is controlled by the servo signal processing circuit 65. The servo signal processing circuit 65 has an interface that receives a control command from the controller 70.

A digitized reproduction signal received from the RF amplifier 64 is supplied to a PLL 68, an EFM demodulating circuit 69, and a timing generating circuit 71. The PLL 68 generates a clock signal that synchronizes with the reproduction signal. A digital audio signal received from the EFM demodulating circuit 69 is supplied to a D/A converter 72. The D/A converter 72 converts the digital audio signal into an analog audio signal. The D/A converted signal is obtained from an audio output terminal 79. Alternatively, an output terminal for the digital audio signal may be disposed.

An output signal of the RF amplifier 64 is supplied to a timing generating circuit 71. The timing generating circuit 71 generates a timing signal that synchronizes with the reproduction signal. An output signal of the timing generating circuit 71 is supplied to a CLV processor 73. The CLV processor 73 drives the spindle motor 63 at CLV.

In the CD player 121 shown in FIG. 17, a subcode separated by the EFM demodulating circuit 69 is supplied to the subcode processor 74. The subcode processor 74 performs a subcode error detecting process and so forth and separates Q channel and R to W channels from the subcode. The Q channel of the subcode is supplied to the controller 70. The R to W channels of the subcode are supplied to a CD-text decoder 75.

The CD text decoder 75 decodes R to W channels of subcode. The CD text decoder 75 has an RAM with a small capacity. The RAM outputs data corresponding to a request issued from the controller 70. The controller 70 selects request data from the CD text data. The selected data is stored in a memory portion 76.

The CD text decoder 75 detects an error of the CD text data. As will be described later, an error of CD text data is detected with an error correction code (cyclic redundancy code: CRC) for each pack. In the redundancy recording format, only when CRC check results for a plurality of redundancy packs are errors, an error flag that represents that the relevant pack has an error is set. In addition to the CD text data, the error detection flag is supplied to the controller 70. The controller 70 references the error detection flag and determines whether or not character information with the CD text data can be displayed. When the CD text data cannot be correctly read or decoded due to dust adhered on the CD or a scratch thereon, the controller 70 issues an alarm.

The controller 70 issues a command to the servo signal processing circuit 65 so as to control the servo system and the decoding process. In addition, the controller 70 controls the operation of the reproducing apparatus. A displaying portion 77 including a display driver is connected to the controller 70. The displaying portion 77 is for example an LCD. The displaying portion 77 displays character information such as CD text. In addition, when the reproducing apparatus cannot read CD text, the displaying portion 77 displays an alarm.

An operation portion 78 supplies an operation signal to the controller 70. The operation portion 78 has disc reproduction keys, program selection keys, program search keys, and so forth. The control signal bus line 131 is connected to the controller 70. The transmitting/receiving unit 132 is connected to the control signal bus line 131. The controller 70 transmits/receives data such as a control signal and character information to/from the commander 100 through the transmitting/receiving unit 132. The character information is read from the memory portion 76 under the control of the controller 70. The character information is transmitted to the commander 100 through the transmitting/receiving unit 132. The character information received by the commander 100 is stored in the memory thereof. The controller 70 corresponds to the controlling portion 127 shown in FIG. 1.

Figure 18:
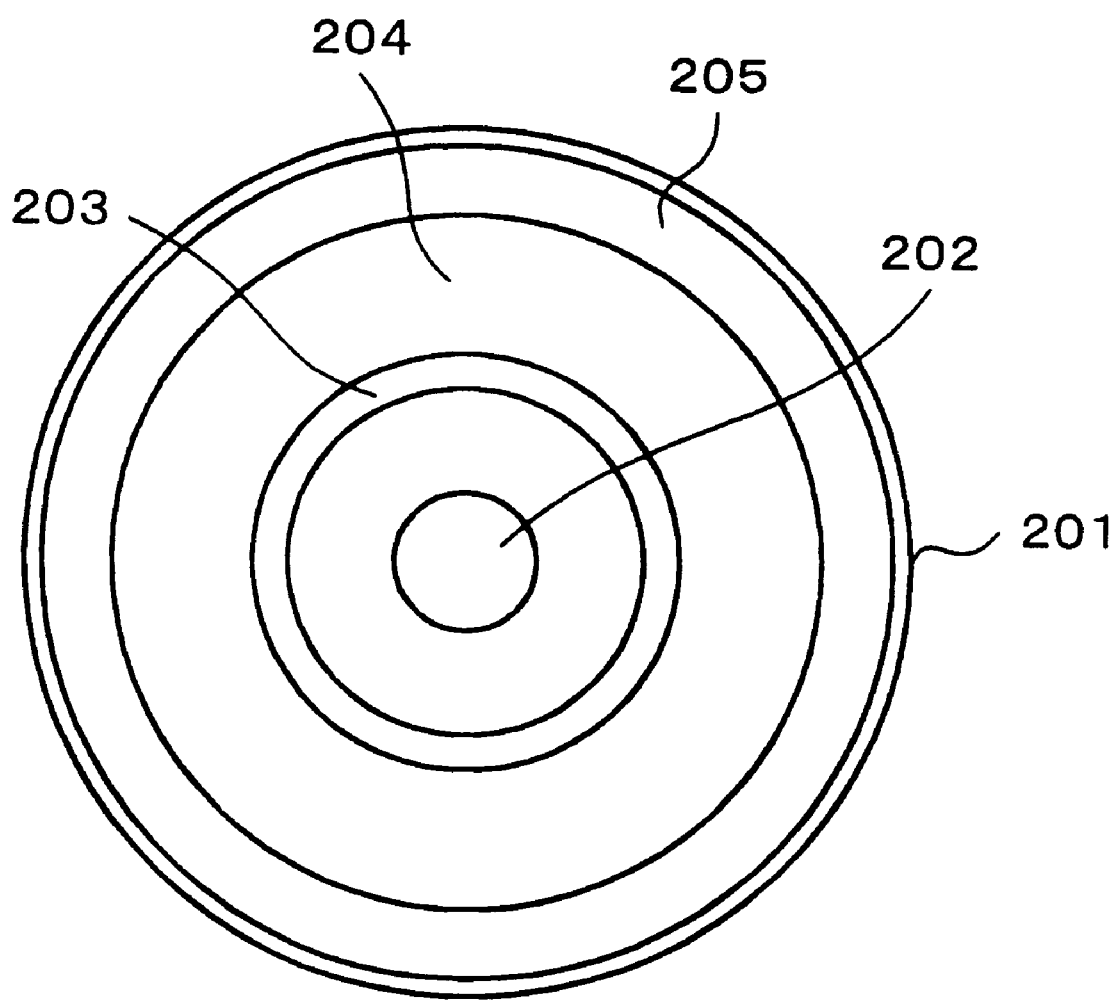
FIG. 18 is a schematic diagram showing the medium format of an optical disc.

Next, the format of the CD text will be described. First of all, for easy understanding, the data structure of an audio CD will be described. Referring to FIG. 18, a CD 201 has a hole 202 at the center thereof. The CD 201 has a lead-in area 203, a program area 204, and a lead-out area 205 that are formed from the inner periphery to the outer periphery. The lead-in area 203 is a program management area in which TOC (Table Of Contents) information is recorded. The program area 204 is an area in which program data is recorded. The lead-out area 205 is a program end area. In the audio CD, audio data is recorded in the program area 204. Time information and so forth for the audio data are managed in the lead-in area 203. When the CD player has read audio data in the program area 204 and the pickup has reached the lead-out area 205, the CD player completes the reproducing operation of the CD.

On a CD, subcode is recorded along with audio data that is main data. Next, data of P and Q channels of subcode will be described. The audio signal of the compact disc is sampled at a sampling frequency of 44.1 kHz. In the sampled data, one sample or one word of 16 bits is divided into two symbols of high order 8 bits and low order 8 bits. An error correction encoding process and an interleaving process are performed for each symbol. 24 symbols of the audio data are formed as a frame. One frame is equivalent to six samples of each of left and right stereo channels.

By EFM (Eight to Fourteen) modulation, each symbol is converted from eight bits into 14 bits. One frame that has been EFM-modulated is composed of a synchronous pattern data area, a subcode area, a program data area, and a parity data area. The synchronous pattern data area is composed of 24 channel bits. The subcode area is composed of 14 channel bits. The program data area is composed of 12 symbols of program data D1 to D12. The parity data area is composed of four symbols of parity data P1 to P4. The program data area and the parity data area are followed by pairs of other program areas and other parity data areas. Each area or each data is connected with three channel bits. Thus, one frame is composed of a total of 588 channel bits.

FIG. 19 shows a data structure of which areas and data portions of 98 frames are successively arranged in the vertical direction. The interval of 98 frames is equal to one subcode. This interval is referred to as subcode frame. The subcode frame is composed of a frame synchronous pattern portion, a subcode portion 237, and a data and parity portion. One subcode frame is equivalent to $\frac{1}{75}$ second of the reproducing time of a CD. The first frame F01 and the second frame F02 are synchronous patterns S0 and S1 of the subcode frame, respectively. As with the frame synchronous pattern, the synchronous patterns of the subcode frame are out-of-rule patterns of the EFM modulation system. Eight bits of one symbol compose P to W channels of the subcode. For example, the P channel is composed of parts of the synchronous patterns S0 and S1 and P01 to P96.

The P channel of the subcode has information that represents whether or not a program is present. The Q channel has absolute time information of a CD, time information of each program, a program number (also termed track number), an index number, and so forth. Thus, with the information of the Q channel, the reproducing operation such as a program top position detecting operation can be controlled. In addition, with the information of the Q channel, the user can visually know the sequence number of a current program on an optical disc, the elapsed time of the program, the absolute time of the program, and so forth.

In addition, data of six channels of R to W channels of the subcode can be used for displaying for example a still picture and a text of a program. A reproducing apparatus using such R to W channels for a still picture and a text of a program is known as CD graphics. Recently, a CD text for recording additional character information with the R to W channels of the lead-in area has been used. In the case of a CD text, up to around 6500 characters can be recorded. The additional character information of a CD text may be restricted to around 800 characters or less so that it can deal with eight languages.

Figure 20:
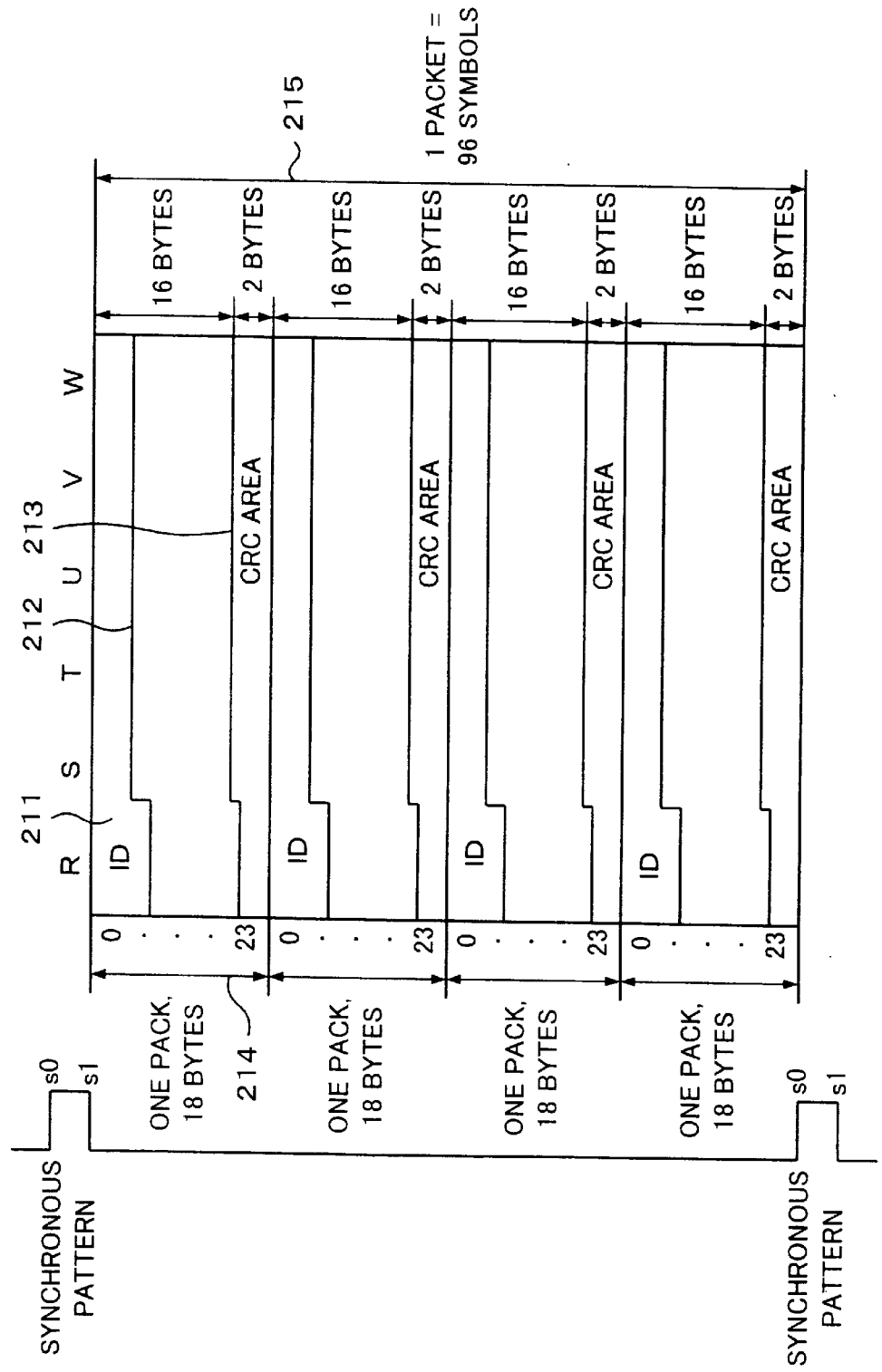
FIG. 20 is a schematic diagram showing the data structure of a CD text as additional character information recorded on an optical disc.

FIG. 20 shows the data structure of a CD text (mode 4) according to an embodiment of the present invention. In a conventional CD, as described above, with 72 bits of one frame of the Q channel in the subcode, the number of programs and record positions of individual programs are managed. In reality, a program number that ranges from 00 to 99, a start address (absolute time) of each program, the first program number, the last program number, and the start address of the lead-out area are recorded. In addition to the Q channel of the subcode, data of the CD text composed of R to W channels as shown in FIG. 20 is recorded in the lead-in area.

The first two frames of data composed of R to W channels are synchronous patterns S0 and S1, respectively. The remaining 96 frames contain 96 symbols (one symbol is composed of six bits). The 96 symbols are divided into four portions (one portion is composed of 24 symbols). The 24 symbols are referred to as one pack (reference numeral 214 of FIG. 20). Four packs are referred to as one packet (reference numeral 215 of FIG. 20).

Each pack starts with an ID area 211 composed of a total of 24 bits of mode information and ID codes (ID1, ID2, ID3, and ID4). The mode information represents a record mode of information recorded on the relevant pack. ID1 represents the type of text information. ID2, ID3, and ID4 represent other identification information. The ID area 211 is followed by a text area 212 that has text information corresponding to main data. The text information is recorded as blocks (one block is composed of eight bits). Each pack has a CRC (Cyclic Redundancy Code) area 213 that is composed of 16 bits. With the cyclic code, an error is detected.

Figure 21:
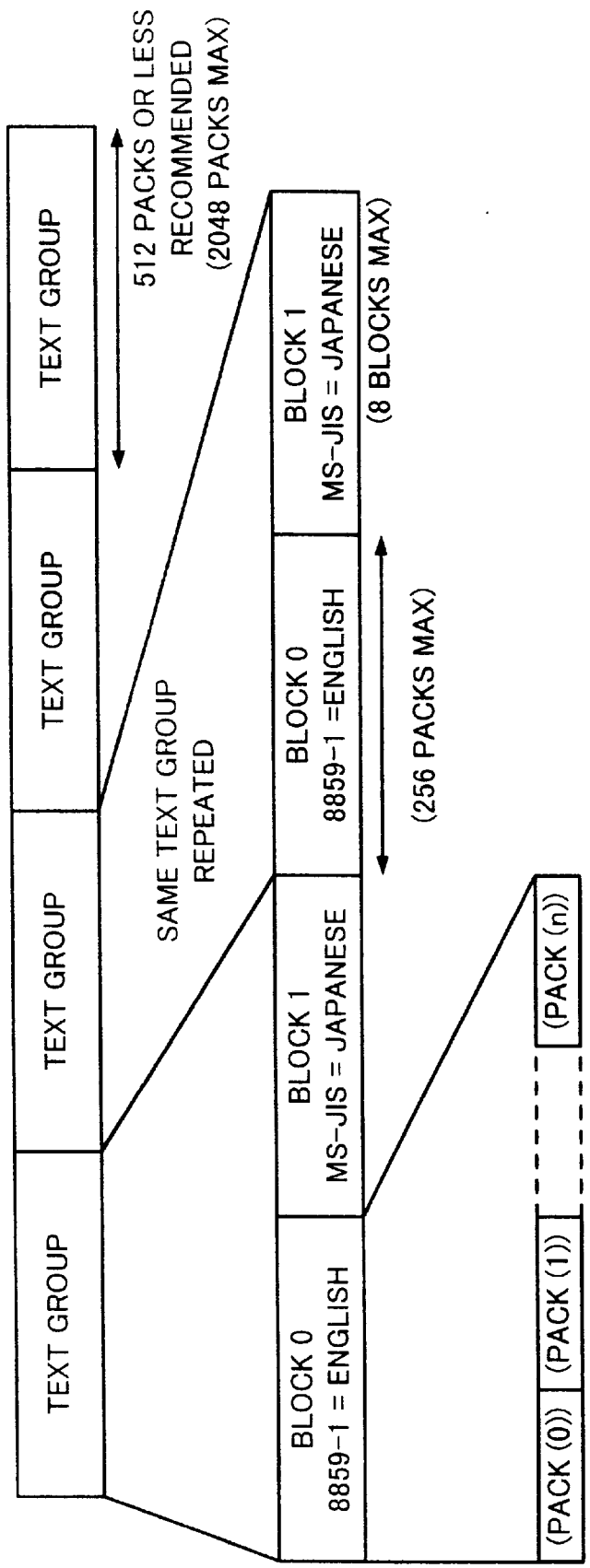
FIG. 21 is a schematic diagram showing the format of a CD text.

FIG. 21 shows an outlined format of a CD text. All character information is recorded in a text group. In the lead-in area, the same text group is repeatedly recorded. One text group is composed of up to eight blocks. FIG. 21 shows that one text group is composed of two blocks (block 0 and block 1).

The block 0 has English character information corresponding to ISO (International Organization for Standardization) 8859-1 codes (in one-byte character format). The block 1 has Japanese character information corresponding to MS-JIS codes (in two-byte character format). Each block is composed of pack 0 to pack n.

Figure 22A:
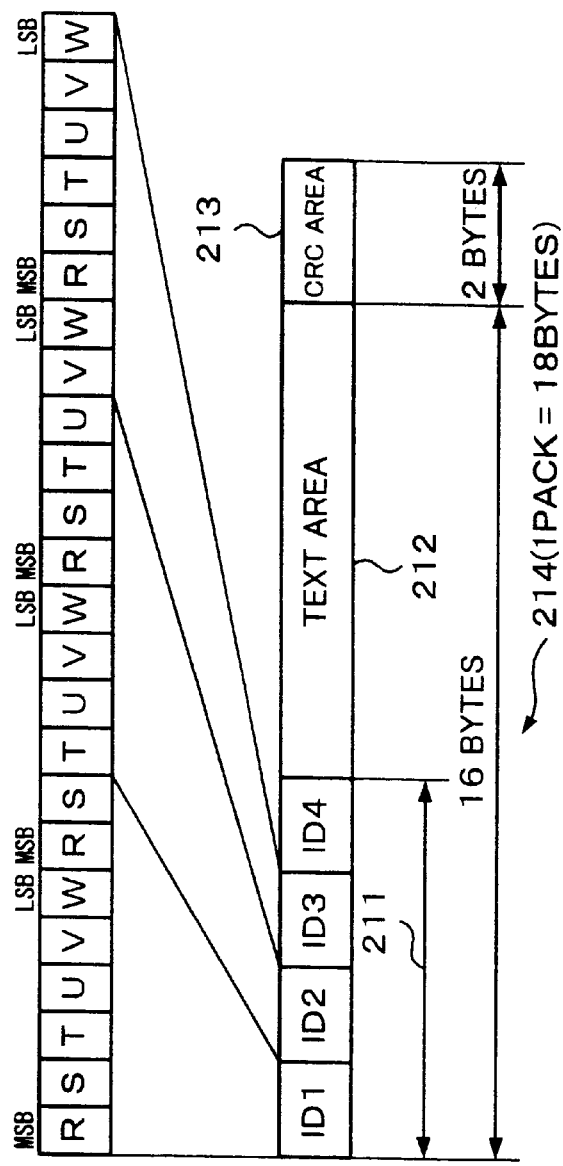
FIG. 22A is a schematic diagram showing one-pack data of a CD text.

FIG. 22A is a schematic diagram showing data of one pack in the data format shown in FIG. 20 as serial data. As shown in FIG. 22A, 32 bits are divided by eight (each byte) and assigned to ID1, ID2, ID3, and ID4 as an ID (header) area 211. In FIG. 22A, only 24 bits are shown. The ID area 211 is followed by a text area 212. The text area 212 is divided into byte data. The text area 212 has a length of 12 bytes. The text area 212 is followed by a CRC area 213. The CRC area 213 has a length of two bytes. A total of 18 bytes of the ID area 211, the text area 212, and the CRC area 213 are referred to as pack 214. Thus, since the data is processed as byte data, the same method as that for the Q channel of a signal can be used. Consequently, the processing circuit can be simply structured.

In the data format of the CD text, an error is detected with CRC error detection code. When an error is detected, the same data is read again. Thus, the same data is written four times for each pack. A data sequence is repeatedly recorded in each packet. In other words, one packet that synchronizes with a subcode sync at intervals of ⅟75 second has four packs. In such a redundant recording method, a complicated error correcting circuit can be omitted.

Figure 22B:
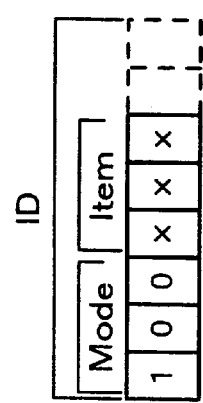
FIG. 22B is a schematic diagram showing a top ID of a CD test.

As shown in FIG. 22B, the ID1 of the ID area 211 is handled with eight bits that are larger than one symbol by two bits. In addition, in the case that a CD with a CD text is loaded to a CD player that has a function for decoding R to W channels of subcode and thereby preventing the player from malfunctioning, mode identification data is written to high order three bits from MSB (Most Significant Bit). In the case of the CD text format recorded in the lead-in area, mode 4 "100" that has not been defined is assigned as the mode represented by the three bits. Thus, even if a CD with a CD text is loaded to a conventional player, it only detects an unrecognizable mode. Consequently, the player only stops the operation, not malfunctions. Alternatively, mode 5 or mode 6 that have not been defined may be used instead of the mode 4.

Figure 23:
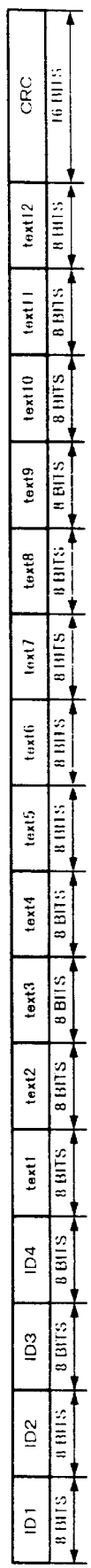
FIG. 23 is a schematic diagram showing one-pack data of a CD text in the case that one-pack data is composed of eight bits.

As shown in FIG. 23, in the example of which ID1 represents the mode 4, one pack has ID1, ID2, ID3, ID4, text bytes text1 to text 12, and a CRC code that are composed of eight bits (one byte) each (except for the CRC code composed of 16 bits).

ID1 has a length of eight bits. ID1 defines data handled in the relevant pack. As described above, to represent the mode 4 with high order bits, ID1 is denoted by (8xh) (where h represents hexadecimal number; and x represents a low-order four bit value).

ID1 represents the content of the character string that follows text1. (80h) represents an album name/program name. (81h) represents a performer name/conductor name/orchestra name. (82h) represents a songwriter name. (83h) represents a composer name. (84h) represents an arranger name. (85h) represents a message. (86h) represents a disc ID. (87h) represents a search keyword. (88h) represents a TOC. (89h) represents a 2nd TOC. (8ah), (8bh), and (8ch) are reserved. (8dh) represents closed information. (8eh) represents UPC/EAN (Universal Product Code/European Article Number) (Position code) of an album and ISRC (Industrial Standard Recording Code) of each track. (8fh) represents a size. "Reserved" represents an area that is currently not defined. Thus, an area "reserved" will be defined in future.

ID2 has a one-bit extension flag and a 7-bit track number or a 7-bit element number. The track number represents a track number of the first character of text data of the current pack. ID2 represents a track number ranging from 1 to 99. Thus, other values such as "0h" and "100h" and higher of ID2 have special meanings. When ID2 is "00", it represents the entire disc. The MSB of ID2 is always "0". When the MSB of ID2 is "1", it represents an extension flag. The pack element number depends on the type of a pack represented by ID1.

ID3 represents a sequential number of the current pack. The sequential number of the block ranges from "00" to "255" (0h to FFh). When ID3="0", it represents ID1=80h.

ID4 has a length of eight bits. The first bit is a DBCC (Double Byte Character Code) identification bit (MSB). The next three bits represent the block number. The last four bits represent the character position of the current pack. If the block includes a DBCC character string, the DBCC identification bit is "1". If the block includes a SBCC (Single BCC) character string, the DBCC identification bit is "0". The block number represents the block number of the current pack. The last four bits represent the character position of text1 of the current pack. "0000" represents the first character. "0001" represents the second character. "0010" represents the third character. "0011", "0100", and so forth represent the fourth character, fifth character, and so forth, respectively.

As described above, the text data is composed of 12 bytes that include a character string or binary information that depends on the type of a pack represented by ID1. In packs other than (ID1=88h), (ID1=89h), and (ID1=8fh), text data is composed of a character string. Each character string includes a null code as a delimiter. In the case of SBCC, one null code is used. In the case of DBCC, two null codes are used. A null code is represented by (00h). The size of a character string is preferably 160 bytes of less.

Figure 24:
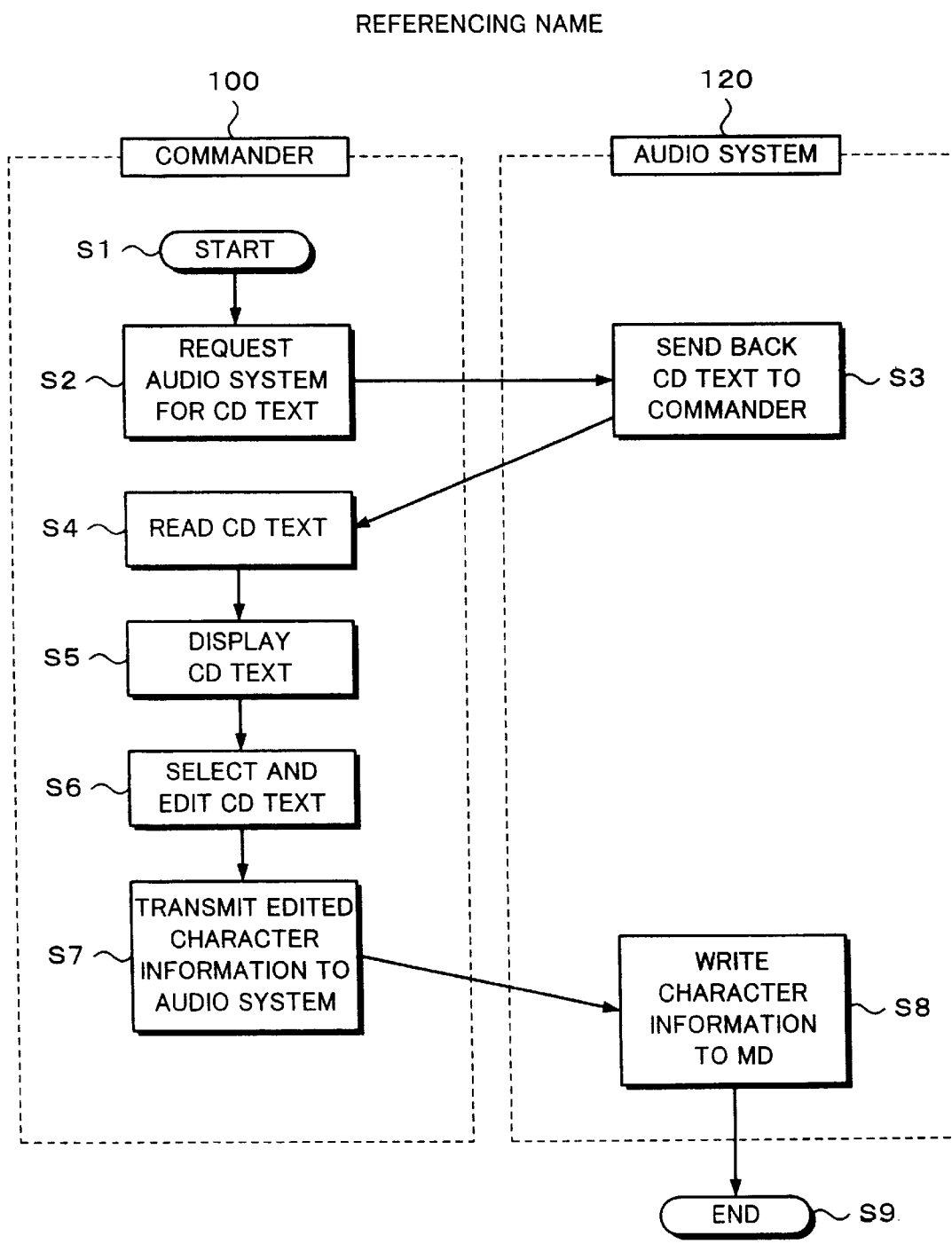
FIG. 24 is a flow chart showing the operation of a remote controlling apparatus in the case that a character string such as a CD text is recorded to a rewritable magnetic optical disc.

When the user touches the icon 58 参照 (reference)" displayed on the displaying portion of the commander 100 with a pen or selects the icon 58 with the jog dial, the audio system enters into the reference mode. Next, the reference mode will be described in detail. FIG. 24 is a flow chart showing a communicating process performed between the commander 100 and the audio system 120. For example, after a program to be dubbed from the CD player 121 to the MD recorder/player 122 has been decided or after the program has been dubbed, character information corresponding to the program recorded to the MD is input. In this case, as was described above, when the user touches the icon 52 "NAME" (see FIG. 11) with the pen, the audio system enters into the character input mode. Thereafter, the user decides a desired program (track number) for the character information. In this case, the user can input the character information with a relevant software keyboard. When the user touches the icon 58 参照 (reference)" with the pen, the audio system enters into the reference mode. At step SI, the user presses the icon 58 参照 (reference)".

In the reference mode, the commander 100 requests the CD player 121 of the audio system 120 for a CD text (at step S2). The CD player 121 sends a CD text stored in the memory portion 76 (see FIG. 17) thereof to the commander 100 (at step S3). The CD text corresponds to the CD on which the dubbed program has been recorded. The commander 100 reads the CD text from the memory (at step S4). Data of the CD text may be limited to principal data such as a disc name, an artist name, and a program name.

Corresponding to the CD text that has been read from the memory, the disc name, artist name, program name, and so forth are displayed on the displaying portion 104 of the commander 100. FIG. 26 shows a practical example of data displayed on the displaying portion 104 of the commander 100. At a lower region of the character input field (editing field 55A (field A) and editing field 55B (field B)), the disc number of the CD text (omitted in the case of a CD changer) and the program names of the CD text are displayed in the order of the track numbers. In the example shown in FIG. 4, program names of four programs of the track numbers 01 to 04 are displayed. Other program names can be displayed by operating a scroll button.

At step S6, a selecting/editing process for a CD text is performed. At step S6, a program name to be added to a program dubbed to the MD is decided. In this case, a program name as the result of the selecting/editing process is displayed in the field A 55A or the field B 55B. The selecting/editing process at step S6 will be described later in detail.

At step S7, the edited character information is transmitted to the audio system 120. When the user touches a transmission icon 56A, the commander 100 transmits the program name displayed in the field A 55A to the audio system 120. When the user touches a transmission icon 56B, the commander 100 transmits the program name displayed in the field B 55B to the audio system 120. The MD recorder 122 of the audio system 120 temporarily stores the program name received from the commander 100 to a memory of the system controller 11 (see FIG. 3) and records it to the U-TOC area of the MD at a predetermined timing (at step S8). Thereafter, the process for the reference mode is completed (at step S9).

As described above, in the reference mode, with reference to the CD text that has been read to the memory of the commander 100, character information to be recorded to the MD is selected and edited. The character information as the result of the selecting/editing process is transmitted to the MD recorder/player 122 of the audio system 120. The character information received from the commander 100 is stored in the memory of the MD recorder/player 122. The character information is read from the memory and recorded to the U-TOC area of the MD at the predetermined timing. Since the character information to be recorded to the U-TOC area of the MD is temporarily stored in the memory, the character input mode and the reference mode can be operated in any of the stop state, reproducing state, and recording state of the MD recorder/player 122.

Figure 25A:
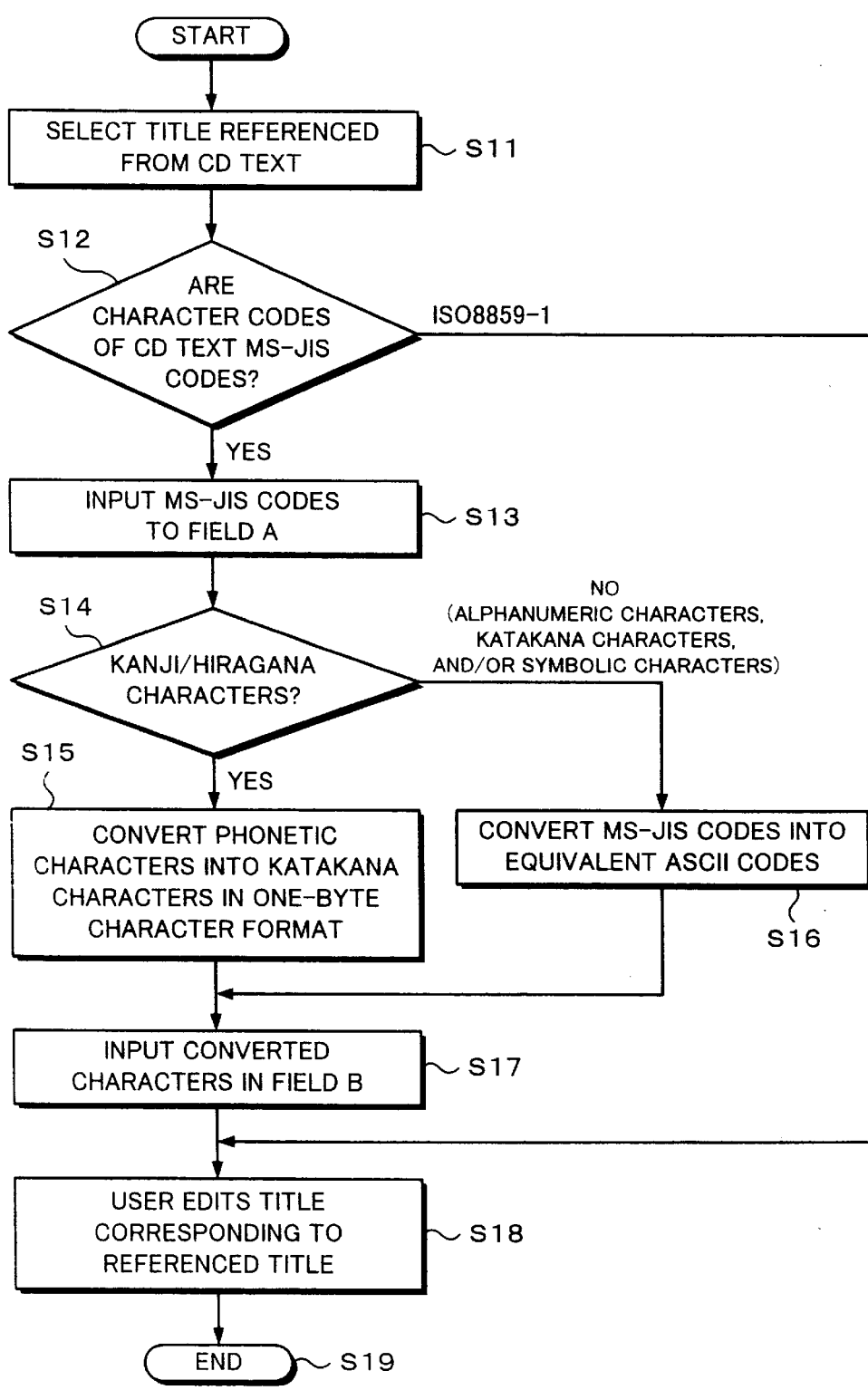
FIGS. 25A and 25B are flow charts showing the operation of the remote controlling apparatus in the case that a character string such as a CD text is automatically converted into another character string.
Figure 25B:
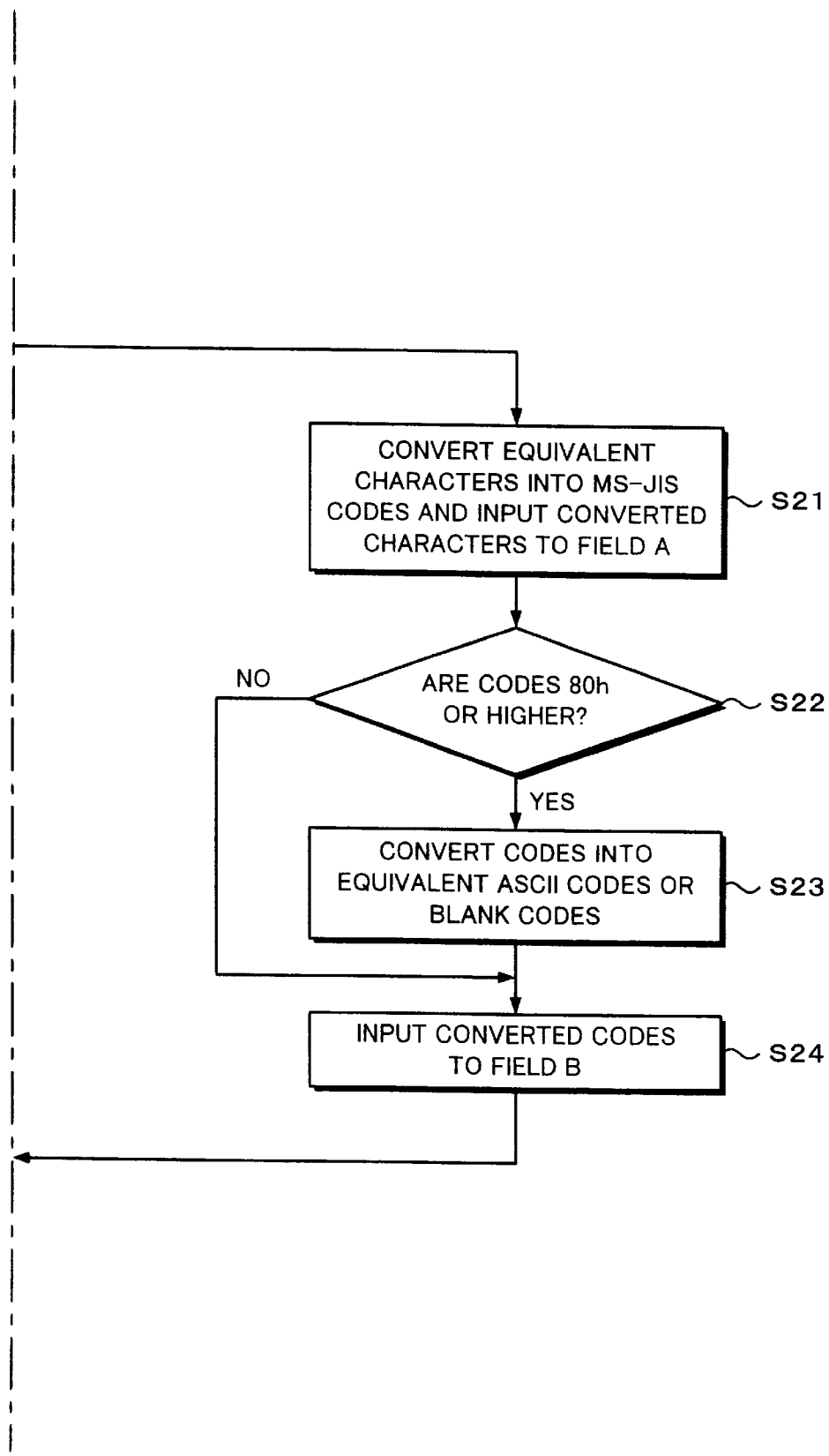

Next, with reference to a flow chart shown in FIGS. 25A and 25B, the selecting/editing process for a CD text in the reference mode (at step S6) will be described in detail. At step S5, data shown in FIG. 26 is displayed. At step S11, a title to be referenced is selected on the displaying portion from a plurality of titles (program names) of the CD text. In FIG. 26, it is assumed that "program 3" of track number 03 has been selected. The user can know the selected state with highlighted characters, blinking characters, different color, or the like. When the user presses the button 確定 (confirm)" or pushes the jog dial, the selected title is confirmed.

It is determined whether or not the character codes of the selected title are MS-JIS codes (at step S12). In this case, as shown in FIG. 21, the CD text is composed of two blocks. Thus, when the character codes of the selected title are not MS-JIS codes, the character codes are ISO 8859-1 codes. When the character codes of the selected CD text are MS-JIS codes, these character codes are input to the field A 55A (at step S13). At step S13, the selected title is stored in a display buffer corresponding to the field A 55A. The title is displayed in the field A 55A.

At step S14, it is determined whether or not the characters of the selected title are Kanji/Hiragana characters. When the determined result at step S14 is Yes (namely, the characters of the selected title are Kanji/Hiragana characters), the phonetic characters are converted into Katakana characters in one-byte character format (at step S15). When the determined result at step S14 is No (namely, the characters of the selected title are other than Kanji/Hiragana characters (namely, alphanumeric characters, Katakana characters, and/or symbolic characters), the flow advances to step S16. At step S16, the characters of the selected title are converted to ASCII codes. At step S17, the title processed at step S15 or S16 is input to the field B 55B.

Thus, the title of the selected CD text is displayed in the field A 55A in two-byte character format. The title of the selected CD text is displayed in the field B 55B with alphanumeric characters, Katakana characters, and/or symbolic characters in one-byte character format. In other words, the selected title is copied to the field A 55A. The selected title is substantially copied to the field B 55B. This is because characters in the field A 55A and characters in the field B 55B are recorded to sector 4 and sector 1 of the U-TOC area of the MD, respectively. At step S18, an editing process is performed so as to change titles displayed on these fields. The editing process can be performed by touching the icon 58. Alternatively, the editing process can be performed in the character input mode of which the above-described character input screen is displayed.

At step S12, when the character codes of the selected title are ISO 8859-1 codes, the character codes are converted into MS-JIS codes and the resultant characters are input to the field A 55A (at step S21). Thereafter, it is determined whether or not the selected title includes character codes of 80h and higher (at step S22). Character codes of 80h and higher are special signs and symbolic characters.

When the selected title does not contain character codes of 80h and higher as the determined result at step S22, the title is input to the field B 55B (at step S24). The ISO 8859-1 codes are the same as the ASCII codes except for character codes of 80h and higher. Thus, at step S24, the selected title is input as ASCII codes to the field B 55B.

When the selected title contains character codes of 80h and higher as the determined result at step S22, the flow advances to step S23. At step S23, character codes of 80h and higher are converted into equivalent character codes or blanks. Thereafter, the selected title is input to the field B 55B (at step S24). Next, the flow advances to step S18. At step S18, when necessary, the referenced title is edited. Since the title contains a disc name as well as program names, the disc name can be referenced and edited in the above-described manner.

In the above-described process, the title of the format of the CD text is referenced. Likewise, a title stored as a custom file, a title recorded on an MD, and characters extracted from a broadcast signal by the tuner can be referenced.

In the embodiment of the present invention, data in two formats can be input corresponding to sectors 1 and 4 of the U-TOC area. However, when the structure of the U-TOC area is changed or modified, data in three or more formats can be input. In addition, as the plurality of character formats, other than the above-described character codes, languages other than Japanese and English, different formats, or the like can be used.

The present invention can be applied to a recording apparatus and a reproducing apparatus that record/reproduce digital video data as well as digital audio data. In addition, the present invention can be applied to a recording apparatus that uses a record medium such as a recordable optical/magnetic disc, a tape shaped record medium or a semiconductor memory.

As described above, according to the present invention, in a recording apparatus such as an MD recorder/player for a digital audio signal, character information of the recording apparatus can be copied from a CD player or the like and recorded. Thus, the character input operation for the recording apparatus can be simplified. In addition to the copying operation, the character information can be edited. Thus, since a disc name, a program name, and so forth are not fixed, the user can record desired character information to a relevant record medium.

When character information can be recorded in different character formats as with sectors 1 and 4 of a magnetic optical disc, character information received from another apparatus can be automatically converted into individual character formats and the resultant character information can be recorded. Thus, the character input operation for character information corresponding to each character format can be omitted.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A digital signal recording apparatus, comprising:

receiving means for receiving a program and a character string related to the program which are both reproduced from a first recording medium;

editing means for editing the character string received by said receiving means; and recording means for recording the character string edited by said editing means and the program to a second recording medium.

2. The digital signal recording apparatus as set forth in claim 1, wherein said editing means is converting means for automatically converting the character string received by said receiving means into another character string.

3. The digital signal recording apparatus as set forth in claim 1, further comprising:

selecting means for selecting a desired character string from character strings received by said receiving means, wherein the character string selected by said selecting means is recorded to the record medium.

4. The digital signal recording apparatus as set forth in claim 1, further comprising:

displaying means for displaying the character string received by said receiving means.

5. The digital signal recording apparatus as set forth in claim 1, wherein the character string corresponding to the program is the title of the record medium.

6. The digital signal recording apparatus as set forth in claim 1, wherein the character string corresponding to the program is the title of each program recorded on the record medium.

7. The digital signal recording apparatus as set forth in claim 1, wherein the character string corresponding to the program is the creator's name of the record medium.

8. The digital signal recording apparatus as set forth in claim 1, wherein the character string corresponding to the program is a character string transmitted from a broadcasting station.

9. The digital signal recording apparatus as set forth in claim 1, wherein the character string corresponding to the program is a character string reproduced from a second record medium.

10. The digital signal recording apparatus as set forth in claim 1, wherein the character string corresponding to the program is a character string that has been stored in a memory.

11. A remote controlling apparatus, comprising:

receiving means for receiving a character string which is reproduced from a first recording medium and related to a program which is also reproduced from the first recording medium;

storing means for storing the character string received by said receiving means;

displaying means for displaying the character string stored by said storing means;

editing means for editing the character string displayed by said displaying means; and transmitting means for transmitting the character string edited by said editing means to a second recording medium.

12. The remote controlling apparatus as set forth in claim 11, further comprising:

selecting means for selecting a desired character string from character strings received by said receiving means, wherein the character string selected by said selecting means is transmitted to the recording apparatus.

13. The remote controlling apparatus as set forth in claim 11, wherein said editing means is converting means for automatically converting the character string received by said receiving means into another character string.

14. The remote controlling apparatus as set forth in claim 11, wherein said editing means is character inputting means connected to the recording apparatus through a predetermined interface.

15. The remote controlling apparatus as set forth in claim 11, wherein said editing means is a touch panel.

16. The remote controlling apparatus as set forth in claim 11, wherein the recording apparatus records the character string transmitted from said transmitting means to a record medium loaded in the recording apparatus in such a manner that the character string corresponds to the program.

17. The remote controlling apparatus as set forth in claim 11,
wherein the reproducing apparatus is an apparatus for reproducing a program and a character string corresponding thereto from a medium.

18. The remote controlling apparatus as set forth in claim 11,
wherein the reproducing apparatus is a receiver for receiving a program and a character string corresponding thereto.

19. A dubbing system, comprising:

a reproducing apparatus having:

reproducing means for reproducing a program and a character string corresponding thereto, and transmitting means for transmitting the program and the character string reproduced by the reproducing means;

an operating apparatus having:

receiving means for receiving the character string transmitted from the transmitting means of said reproducing apparatus, storing means for storing the character string received by the receiving means, displaying means for displaying the character string storing by the storing means;

editing means for editing the character string displayed by the displaying means, and transmitting means for transmitting the character string edited by the editing means; and a recording apparatus having:

receiving means for receiving the program transmitted from the transmitting means of said reproducing apparatus and the character string transmitted from the transmitting means of said operating apparatus, and recording means for recording the program and the character string received by the receiving means.

20. The dubbing system as set forth in claim 19,
wherein the editing means is converting means for automatically converting the character string received by the receiving means of said operating apparatus into another character string.

21. The dubbing system as set forth in claim 19, further comprising:

selecting means for selecting a desired character string from character strings received by the receiving means of said operating apparatus, wherein the character string selected by said selecting means is transmitted to said recording apparatus.

22. A digital signal recording method, comprising the steps of:

(a) receiving a character string and a related program from a reproducing of a first recording medium containing the character string and related program;

(b) displaying the character string received in step (a);

(c) editing the character string displayed in step (b);

(d) recording the character string edited in step (c) along with the related program on a second recording medium.

23. A remote controlling method, comprising the steps of:

(a) receiving a character string and a related program from a reproducing of a first recording medium containing the character string and related program;

(b) storing the character string received in step (a);

(c) displaying the character string stored in step (b);

(d) editing the character string displayed in step (c);

(e) transmitting the character string edited in step (d) to a recording apparatus; and (f) recording the character string transmitted in step (e) and the related program in a second recording medium.

* * * * *

UNITED STATES PATENT AND TRADEMARK OFFICE
CERTIFICATE OF CORRECTION

PATENT NO. : 6,295,267 B1
DATED : September 25, 2001
INVENTOR(S) : Yoshiyuki Takaku et al.

It is certified that error appears in the above-identified patent and that said Letters Patent is hereby corrected as shown below:

Column 4,
Line 16, please change "diagrams" to -- diagram --.

Column 13,
Line 18, please add quotation marks around the Japanese symbol "ア".

Column 14,
Line 62, please add a quotation mark before the Japanese symbol "変換".

Column 15,
Line 1, please add a quotation mark before the Japanese symbol "かな";
Line 2, please add a quotation mark before the Japanese symbols "カナ" and "記号", respectively;
Line 3, please add a quotation mark before the Japanese symbol "英数大";
Line 4, please add a quotation mark before the Japanese symbols "コード" and "英数大"; respectively;
Line 8, please add quotation marks around the Japanese symbol "カナ";
Line 17, please add quotation marks around the Japanese symbol "英数大";
Line 19, please add quotation marks around the Japanese symbol "英数小";
Line 21, please add quotation marks around the Japanese symbol "記号"; and
Line 43, please add a quotation mark before the Japanese symbol "参照".

UNITED STATES PATENT AND TRADEMARK OFFICE
CERTIFICATE OF CORRECTION

PATENT NO. : 6,295,267 B1
DATED : September 25, 2001
INVENTOR(S) : Yoshiyuki Takaku et al.

It is certified that error appears in the above-identified patent and that said Letters Patent is hereby corrected as shown below:

<u>Column 20,</u>
Line 44, please change "of" to -- or --;
Line 45, please add a quotation mark before the Japanese symbol "表用";
Line 62, please add a quotation mark before the Japanese symbol "表用";
Line 63, change "SI" to -- S1 --; and
Line 64, please add a quotation mark before the Japanese symbol "表用".

Signed and Sealed this

Twelfth Day of March, 2002

Attest:

*Attesting Officer*

JAMES E. ROGAN
*Director of the United States Patent and Trademark Office*